US010965826B2

(12) United States Patent
 Nishiyama

(10) Patent No.: US 10,965,826 B2
(45) Date of Patent: Mar. 30, 2021

(54) METHOD FOR CONTROLLING INFORMATION PROCESSING APPARATUS AND STORAGE MEDIUM

(71) Applicant: CANON KABUSHIKI KAISHA, Tokyo (JP)

(72) Inventor: Kaori Nishiyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/806,744

(22) Filed: Mar. 2, 2020

(65) Prior Publication Data

US 2020/0296238 A1    Sep. 17, 2020

(30) Foreign Application Priority Data

Mar. 15, 2019  (JP) .............................. JP2019-048235

(51) Int. Cl.
 *G06F 3/12*       (2006.01)
 *H04N 1/00*      (2006.01)

(52) U.S. Cl.
 CPC ..... *H04N 1/00411* (2013.01); *H04N 1/00389* (2013.01); *H04N 1/00413* (2013.01); *H04N 1/00474* (2013.01)

(58) Field of Classification Search
 None
 See application file for complete search history.

(56) References Cited

U.S. PATENT DOCUMENTS

| 8,384,923 | B2* | 2/2013 | Matoba ................. G06F 3/1257 |
| | | | 358/1.13 |
| 9,607,250 | B2* | 3/2017 | Nakagawa ........... G06F 3/1284 |
| 9,720,635 | B2* | 8/2017 | Okuma ................. G06F 3/1204 |
| 10,394,503 | B2* | 8/2019 | Kobayashi ........... G06F 3/1285 |
| 2016/0364183 | A1* | 12/2016 | Saito ..................... G06F 3/1274 |
| 2018/0139343 | A1* | 5/2018 | Igawa ................ H04N 1/00344 |

FOREIGN PATENT DOCUMENTS

JP         2015-22651 A      2/2015

* cited by examiner

*Primary Examiner* — Paul F Payer
(74) *Attorney, Agent, or Firm* — Canon U.S.A., Inc. IP Division

(57) ABSTRACT

A first soft key for use of a function that differs from a function available by selecting a second soft key displayed in a second display area of an information processing apparatus or a first soft key for use of a function that is the same as a function available by selecting a second soft key displayed in the second display area is displayed in a first display area displayed together with the second display area in accordance with a display condition.

10 Claims, 31 Drawing Sheets

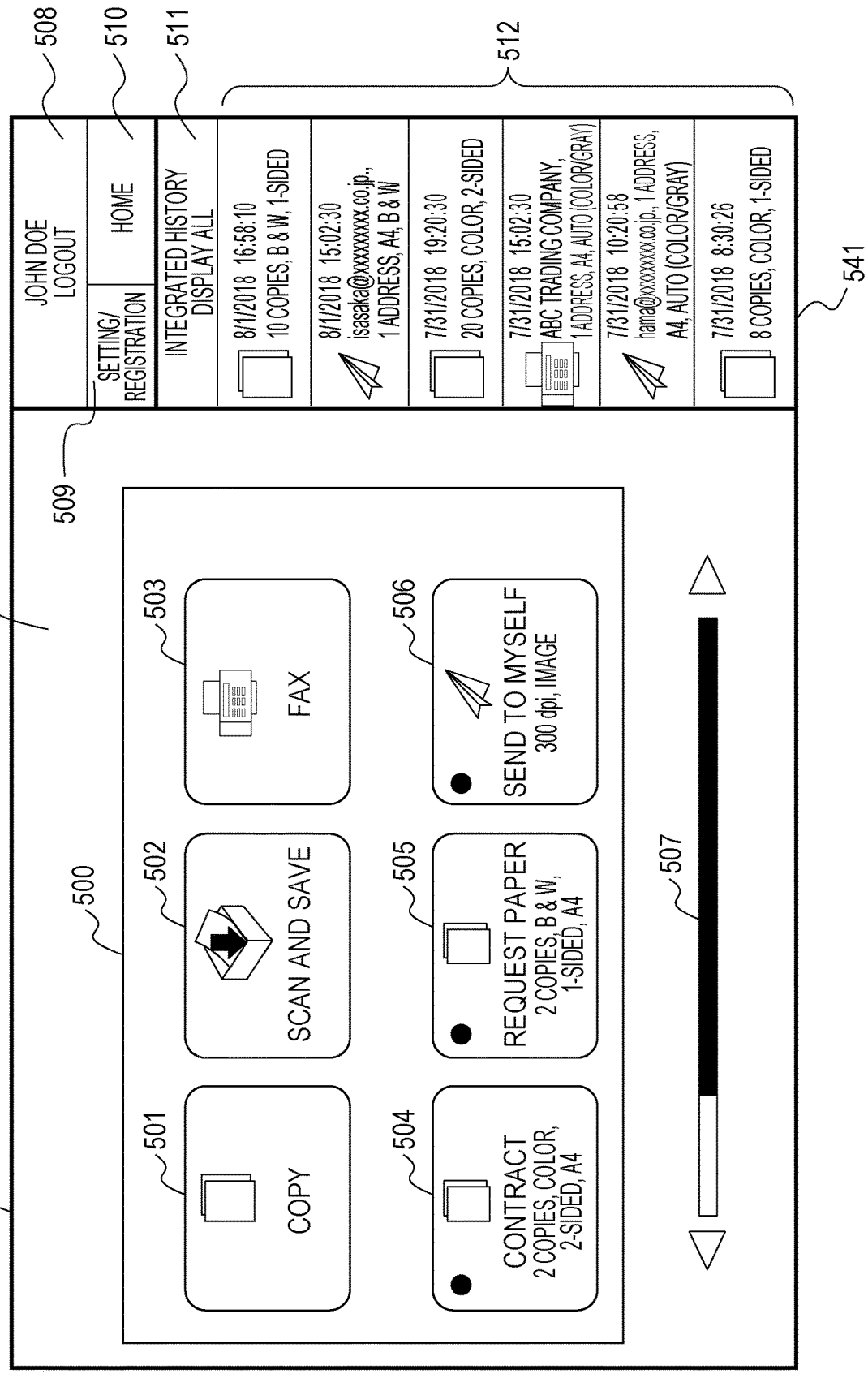

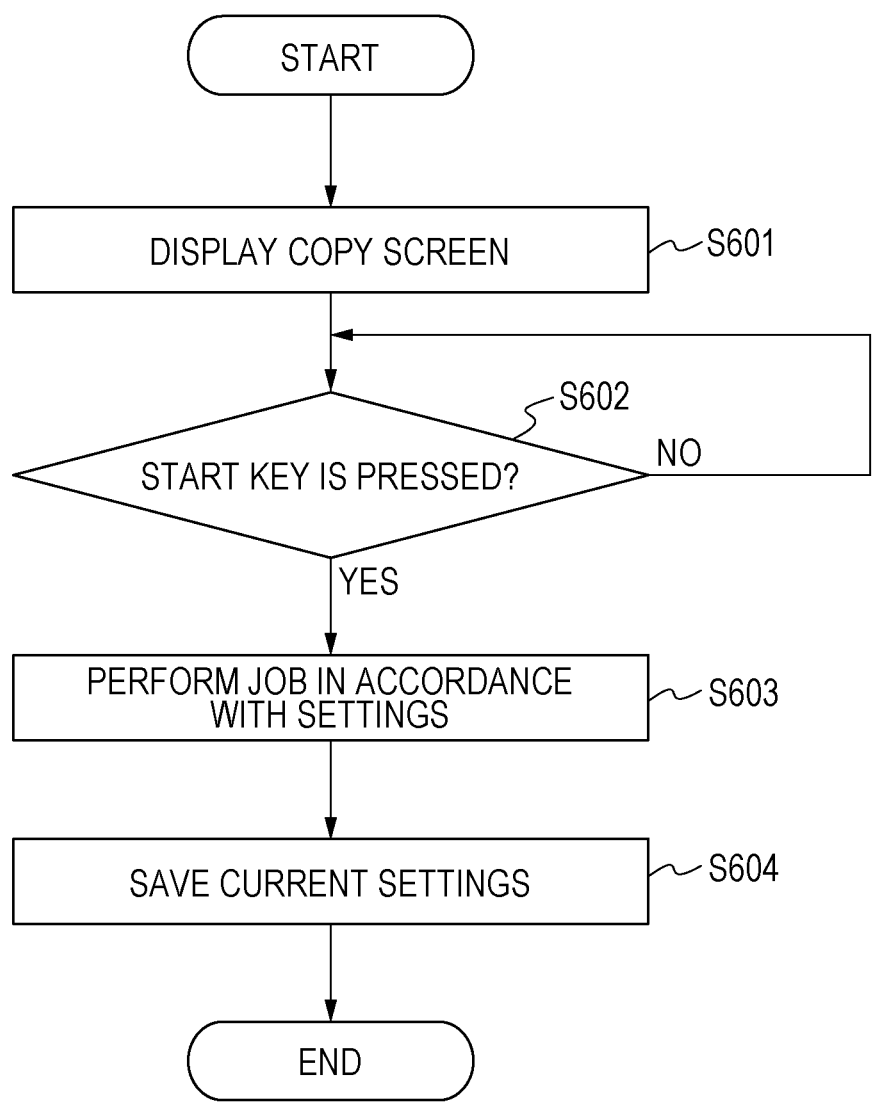

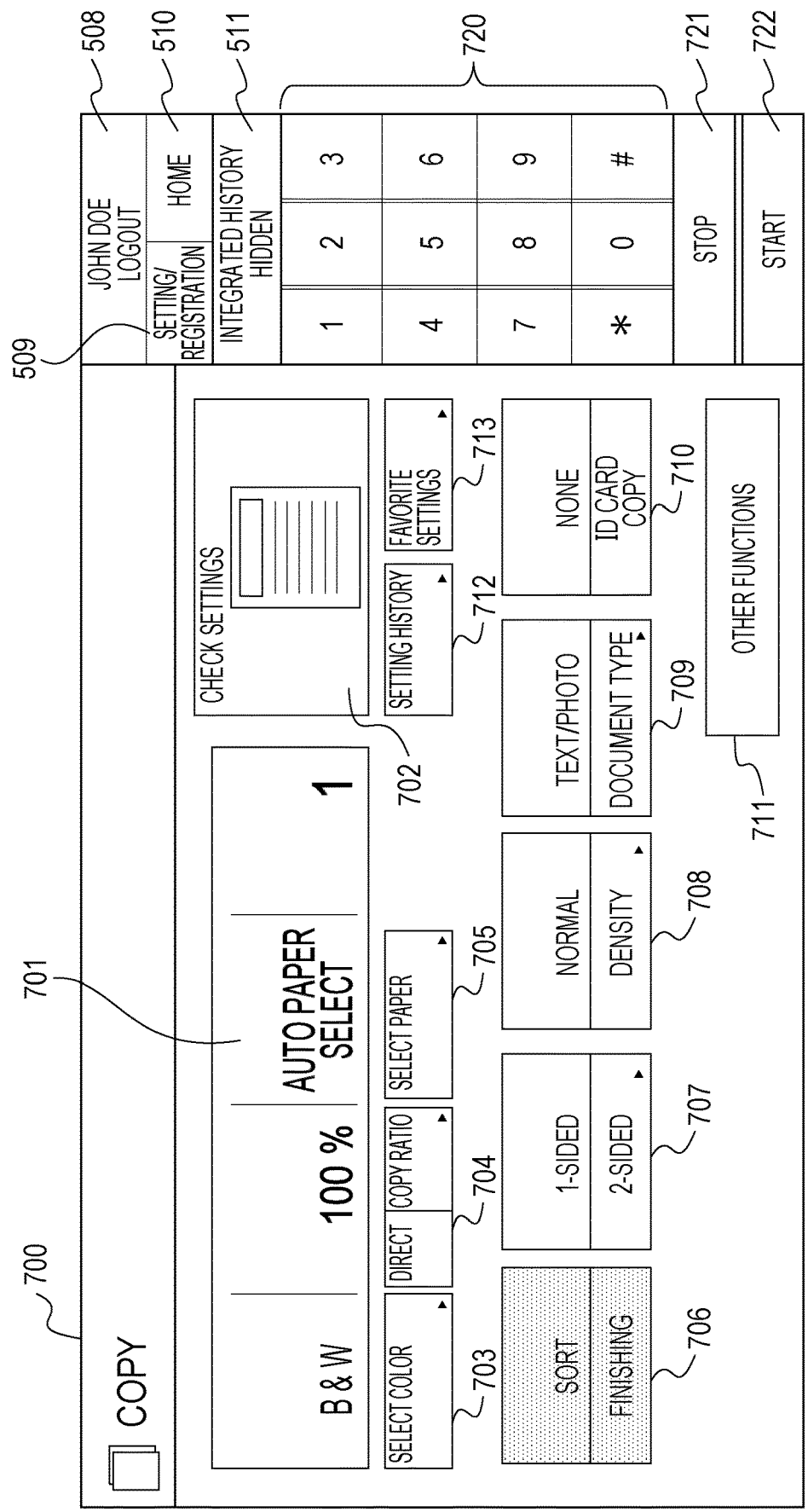

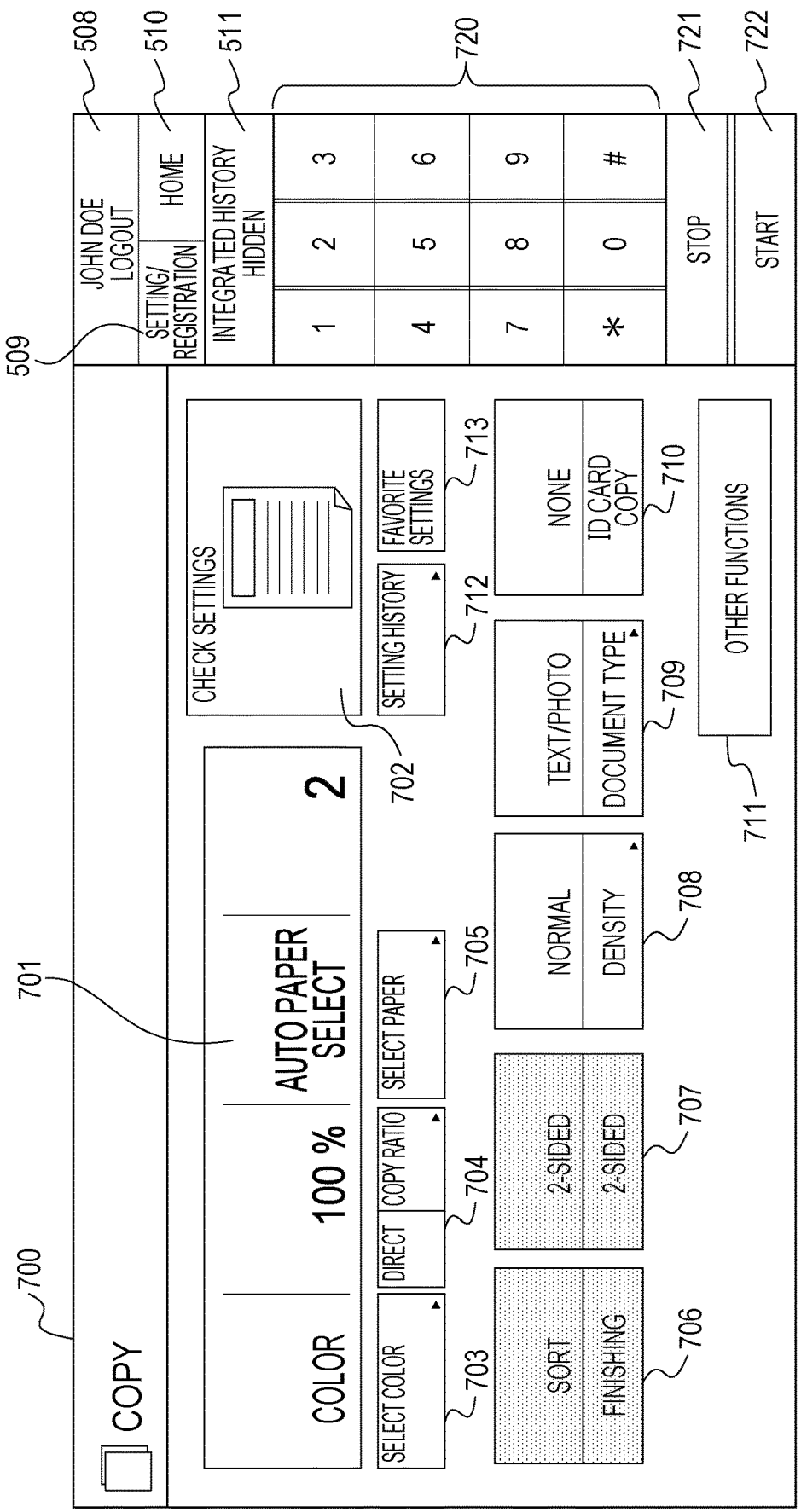

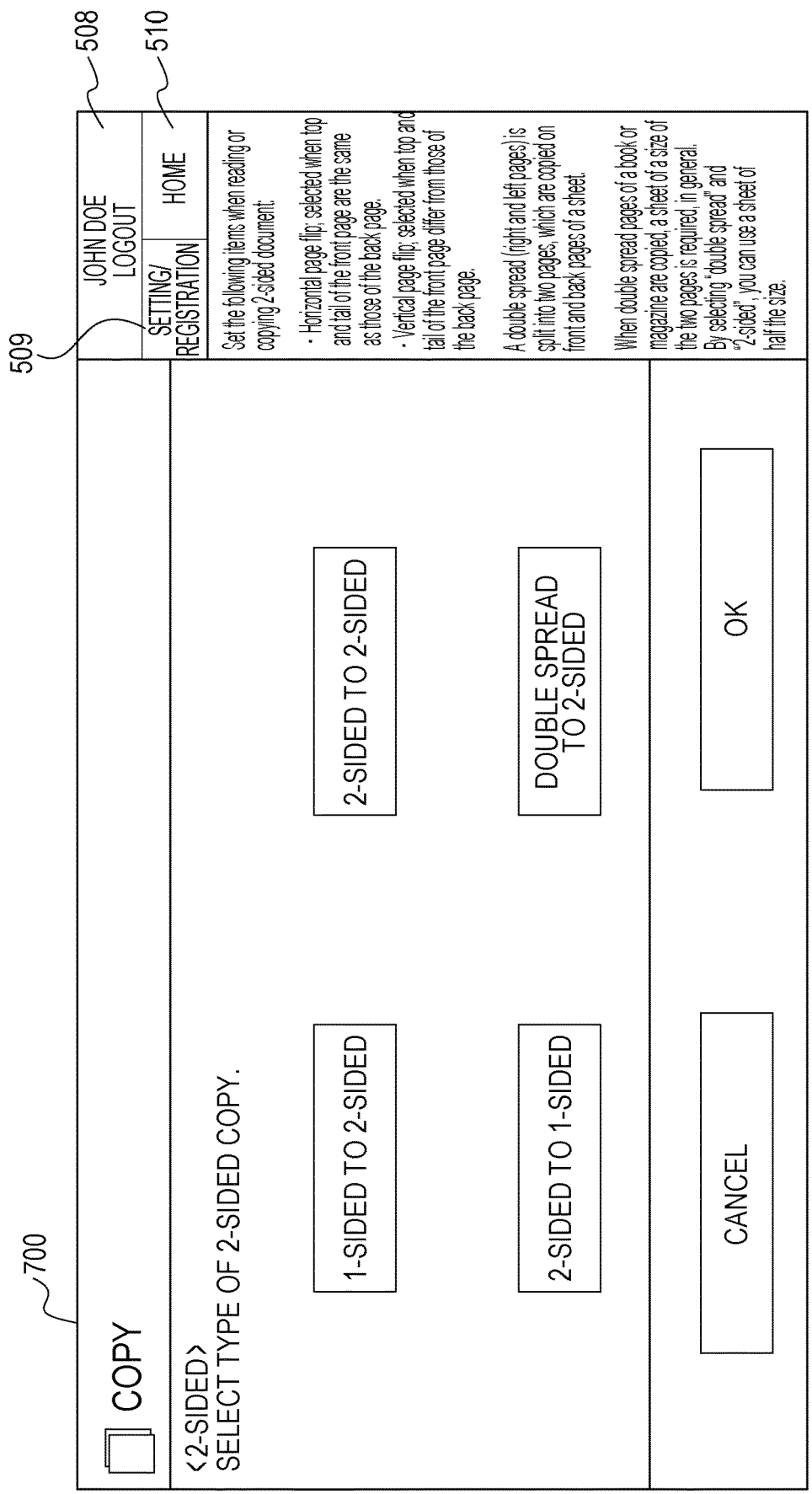

FIG. 8A

| TYPE | SETTING VALUES | | | | | |
|---|---|---|---|---|---|---|
| | NUMBER OF COPIES | COLOR SELECTION | PAPER SELECTION | MULTIPLE-UP | 2-SIDED | DOUBLE SPREAD →2 PAGES | COPY RATIO | etc.... |
| DEFAULT SETTINGS | 1 | B & W | AUTO | 1 in 1 | 1-SIDED | OFF | 100% | ... |
| CURRENT SETTINGS | 2 | COLOR | AUTO | 1 in 1 | 2-SIDED | OFF | 100% | ... |

FIG. 8B

| TYPE | SETTING VALUES | | | | | |
|---|---|---|---|---|---|---|
| | NUMBER OF COPIES | COLOR SELECTION | PAPER SELECTION | MULTIPLE-UP | 2-SIDED | DOUBLE SPREAD →2 PAGES | COPY RATIO | etc.... |
| DEFAULT SETTINGS | 1 | B & W | AUTO | 1 in 1 | 1-SIDED | OFF | 100% | ... |
| CURRENT SETTINGS | 5 | COLOR | AUTO | 1 in 1 | 2-SIDED | OFF | 100% | ... |

| BUTTON ID | APPLICATION ID | DATA | DATE & TIME | DISPLAY TEXT / SETTING VALUE |
|---|---|---|---|---|
| 10001 | 201 | data20120.xml | 7/30/2018 8:20:14 | meeting material.doc, A4, 2 in 1 2-SIDED 1 STAPLED COPY |
| 10002 | 204 | data20448.xml | 7/30/2018 14:08:02 | OVERTIME WORK APPLICATION FORM, A4, 1-SIDED 1 COPY |
| 10003 | 201 | data20121.xml | 7/30/2018 22:30:02 | meeting material.doc, A4, 2 in 1 2-SIDED 10 STAPLED COPIES |
| 10004 | 201 | data20122.xml | 7/31/2018 9:00:02 | supplementary meeting material.doc 2-sided, A4, 2 in 1 2-SIDED 10 STAPLED COPIES |
| 10005 | 101 | data10151.xml | 7/31/2018 8:30:26 | 8 COPIES, COLOR, 1-SIDED |
| 10006 | 202 | data20208.xml | 7/31/2018 10:20:58 | hama@xxxxxxxx.co.jp, 1 ADDRESS, A4, AUTO (COLOR/GRAY) |
| 10007 | 103 | data10353.xml | 7/31/2018 15:02:30 | ABC TRADING COMPANY, 1 ADDRESS, A4, AUTO (COLOR/GRAY) |
| 10008 | 101 | data10154.xml | 7/31/2018 19:20:30 | 20 COPIES, COLOR, 2-SIDED |
| 10009 | 202 | data20209.xml | 8/1/2018 15:02:30 | isasaka@xxxxxxxx.co.jp, 1 ADDRESS, A4, B & W |
| 10010 | 101 | data10152.xml | 8/1/2018 16:58:10 | 10 COPIES, B & W, 1-SIDED |
| 10011 | | | | |
| 10012 | | | | |
| 10013 | | | | |
| 10014 | | | | |
| 10015 | | | | |

FIG. 10B

| BUTTON ID | APPLICATION ID | DATA | DATE & TIME | DISPLAY TEXT | SETTING VALUE |
|---|---|---|---|---|---|
| 10001 | 201 | data20120.xml | 7/30/2018 8:20:14 | meeting material.doc, A4, 2 in 1 2-SIDED 1 STAPLED COPY | |
| 10002 | 204 | data20448.xml | 7/30/2018 14:08:02 | OVERTIME WORK APPLICATION FORM, A4, 1-SIDED 1 COPY | |
| 10003 | 201 | data20121.xml | 7/30/2018 22:30:02 | meeting material.doc, A4, 2 in 1 2-SIDED 10 STAPLED COPIES | |
| 10004 | 201 | data20122.xml | 7/31/2018 9:00:02 | supplementary meeting material.doc 2-sided, A4, 2 in 1 2-SIDED 10 STAPLED COPIES | |
| 10005 | 101 | data10151.xml | 7/31/2018 8:30:26 | | 8 COPIES, COLOR, 1-SIDED |
| 10006 | 202 | data20208.xml | 7/31/2018 10:20:58 | hama@xxxxxxx.co.jp, 1 ADDRESS, A4, AUTO (COLOR/GRAY) | |
| 10007 | 103 | data10353.xml | 7/31/2018 15:02:30 | ABC TRADING COMPANY, 1 ADDRESS, A4, AUTO (COLOR/GRAY) | |
| 10008 | 101 | data10154.xml | 7/31/2018 19:20:30 | | 20 COPIES, COLOR, 2-SIDED |
| 10009 | 202 | data20209.xml | 8/1/2018 15:05:30 | isasaka@xxxxxxx.co.jp, 1 ADDRESS, A4, B & W | |
| 10010 | 101 | data10152.xml | 8/1/2018 16:58:10 | | 10 COPIES, B & W, 1-SIDED |
| 10011 | 101 | data10153.xml | 8/2/2018 8:26:56 | | 2 COPIES, COLOR, 2-SIDED |
| 10012 | | | | | |
| 10013 | | | | | |
| 10014 | | | | | |
| 10015 | | | | | |

| | SETTING VALUES | | | | | | | |
|---|---|---|---|---|---|---|---|---|
| TYPE | DESTINATION | NUMBER OF DESTINATIONS | 2-SIDED ORIGINAL | SCAN SIZE | DIFFERENT SIZE ORIGINALS | FILE TYPE | COLOR SELECTION | RESOLUTION | etc.... |
| DEFAULT SETTINGS | - | - | - | - | - | PDF | AUTO (COLOR/B & W) | 600 dpi | ... |
| CURRENT SETTINGS | inoue@xxxxxxxxx.co.jp | 1 ADDRESS | - | A4 | - | PDF | AUTO (COLOR/GREY) | 300 dpi | ... |

1401 — SETTING VALUES row
1402 — DEFAULT SETTINGS row
1403 — CURRENT SETTINGS row

| APPLICATION ID | APPLICATION NAME |
|---|---|
| 101 | COPY |
| 102 | SCAN AND SAVE |
| 103 | FAX |
| 901 | CUSTOM MENU 1 |
| 902 | CUSTOM MENU 2 |
| 903 | CUSTOM MENU 3 |
| 201 | PRINT |
| 202 | SEND |
| 203 | USE OF SAVED DOCUMENT |
| 904 | CUSTOM MENU 4 |
| 905 | CUSTOM MENU 5 |
| 000 | |

| NUMBER OF BUTTONS PER PAGE |
|---|
| 6 |

| CUSTOM MENU ID | APPLICATION ID | APPLICATION NAME | SETTING |
|---|---|---|---|
| CUSTOM MENU 1 | 101 | CONTRACT | 2 COPIES, COLOR, 2-SIDED, A4 |
| CUSTOM MENU 2 | 101 | REQUEST PAPER | 2 COPIES, B & W, 1-SIDED, A4 |
| CUSTOM MENU 3 | 202 | SEND TO MYSELF | 300 dpi, IMAGE, kiyano.taro@xxxxx.co.jp |
| CUSTOM MENU 4 | 203 | LATE NIGHT DRIVING APPLICATION FORM | 2 COPIES, B & W, 1-SIDED, A4, \\xxx.cp.jp\APPLICATION FORM\LATE NIGHT DRIVING APPLICATION FORM |
| CUSTOM MENU 5 | 203 | SIGNED CONTRACT | 2 COPIES, B & W, 1-SIDED, A4, \\xxx.cp.jp\PRINT-QUEUE\SIGNED CONTRACT |
| CUSTOM MENU 6 | 000 | | |
| CUSTOM MENU 7 | 000 | | |
| CUSTOM MENU 8 | 000 | | |
| CUSTOM MENU 9 | 000 | | |
| CUSTOM MENU 10 | 000 | | |

FIG. 17

| SETTING ITEM | SETTING |
|---|---|
| AFTER LOGIN/AFTER PREDETERMINED PERIOD OF INACTIVITY | DISPLAY ALL |
| WHEN PERFORMING OPERATION ON AREA OUTSIDE INTEGRATED HISTORY | FILTER BY DISPLAYED APPLICATION |

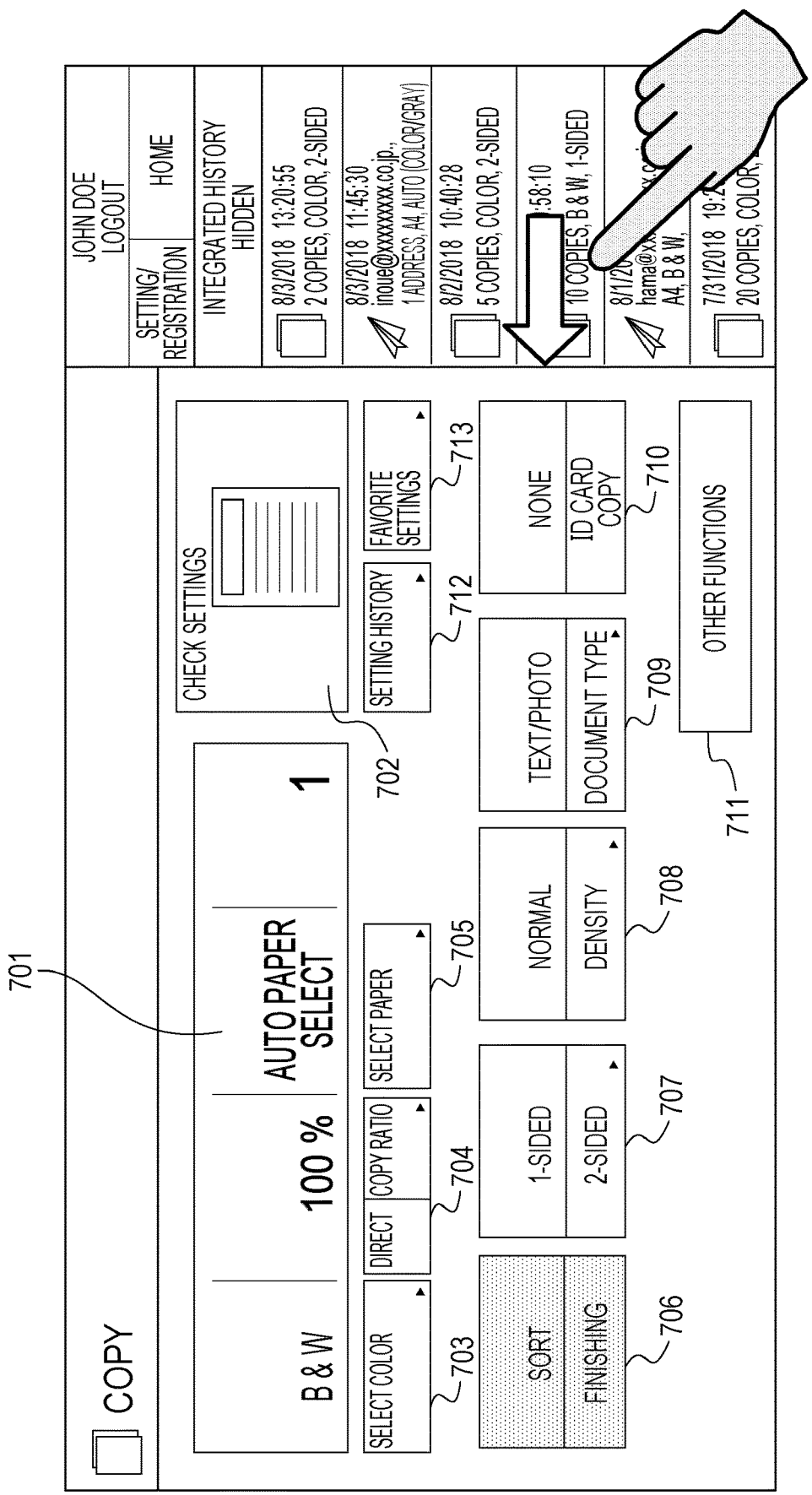

METHOD FOR CONTROLLING INFORMATION PROCESSING APPARATUS AND STORAGE MEDIUM

BACKGROUND

Field

The present disclosure relates to a method for controlling an information processing apparatus having an operation history, and a program.

Description of the Related Art

When an image processing apparatus, such as a multi-function peripheral (MFP), is used to perform processing (e.g., printing), the settings, such as the paper size, the number of copies, and monochrome printing, are input to the image processing apparatus. To avoid such a troublesome setting operation performed each time an image processing apparatus is used, Japanese Patent Laid-Open No. 2015-22651 describes a document management system that displays an operation history in the form of a timeline (history timeline). The history timeline is included and displayed in an existing screen (home screen) of a display/operation panel. If an item (hereinafter referred to as a "history button") included in the history timeline is pressed, an application screen corresponding to the operation history is displayed. By pressing an execution button in the application screen, a process is performed in accordance with the settings stored in the operation history selected on the history timeline.

SUMMARY

According to an aspect of the present disclosure, an information processing apparatus includes a display unit and a setting unit. The display unit is configured to display a first soft key in a first display area of a display screen of the information processing apparatus, display a second soft key in a second display area of the display screen, display a setting screen that contains, as initial settings, settings predetermined by a user as default settings if the first soft key is selected, and display a setting screen that contains, as initial settings, settings of a job executed by using one of a plurality of functions of the information processing apparatus if the second key is selected. The setting unit is configured to set a display condition for displaying the second soft key in the second display area. One of the second soft key for use of a function that differs from a function available by selecting the first soft key and the second soft key for use of a function that is the same as a function available by selecting the first soft key is displayed in the second display area, in accordance with the display condition set by the setting unit.

Further features of the present disclosure will become apparent from the following description of exemplary embodiments with reference to the attached drawings.

BRIEF DESCRIPTION OF THE DRAWINGS

FIGS. 5A and 5B are schematic illustrations of a home screen.

FIG. 6 is a flowchart illustrating an example of the processes performed after startup of an application until a job is executed.

FIGS. 7A, 7B, and 7C are schematic illustrations of a copy screen.

FIGS. 8A and 8B illustrate an example of a data table stored in a memory area for a copy function.

FIGS. 10A and 10B illustrate an example of a setting data table stored for an integrated history.

FIG. 14 illustrates a data table stored in a memory area for a transmission function.

FIGS. 15A, 15B, and 15C illustrate an example of a personal information data table related to home screen display.

FIG. 17 illustrates an example of an integrated history display format data table.

FIGS. 24A and 24B illustrate an example of a switching operation of an integrated history group.

DESCRIPTION OF THE EMBODIMENTS

To effectively display the history buttons on the history timeline, two methods described below are conceivable. A first one is a method for preventing a function that can be used by the history button from overlapping a function that can be used by the application button displayed in the home screen together with the history button. In this manner, a function that is not displayed as an application button in the displayed home screen can be selected from among the displayed history buttons.

A second one is a method for making a function that can be used by the history button overlap a function that can be used by the application button. In this manner, for example, a user who intends to use the copy function can select either the application button or the history button when using the copy function.

As described above, to display the history button effectively, a plurality of display forms are conceivable. The present disclosure enables the user to set up the apparatus with a home screen having an area for placing application buttons and an area for placing history buttons so that a function executed by selecting an application button and a function executed by selecting a history button can overlap with each other or not.

According to the present disclosure, for a home screen having an area for placing application buttons and an area for placing history buttons, the setting can be made so that a function executed by selecting an application button and a function executed by selecting a history button overlap with each other or not.

Exemplary embodiments of the present disclosure are described in detail below with reference to the accompanying drawings. According to the exemplary embodiments, an image processing apparatus, such as an MFP, is used as an example of the information processing apparatus. However, the scope of the attached claims is not limited thereto. The present disclosure is applicable to any device with a touch panel, such as a smartphone. All of the features and the combinations thereof described in the exemplary embodiments are not necessarily essential.

First Exemplary Embodiment

Figure 1:
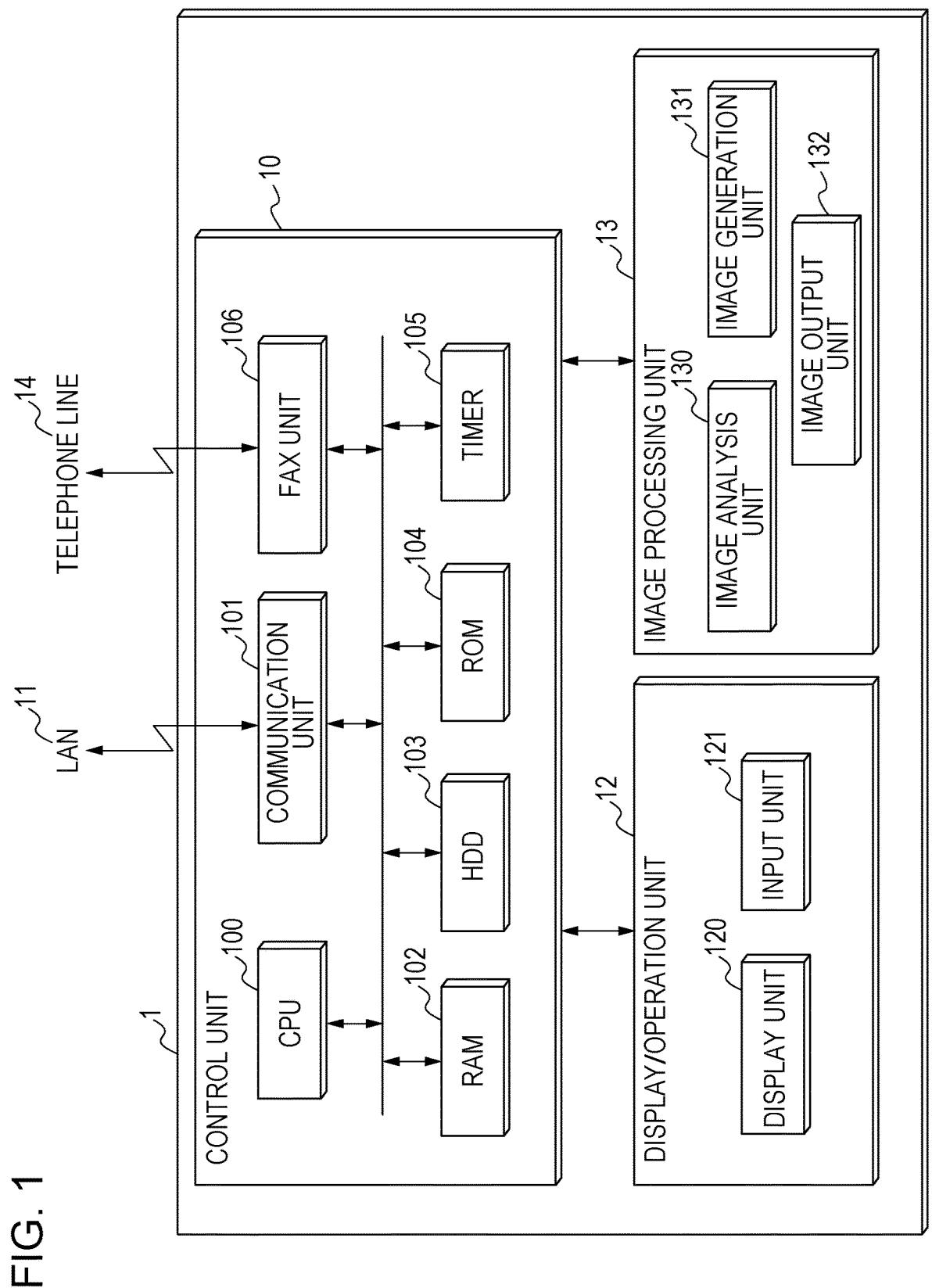
FIG. 1 is a block diagram of the configuration of an image processing apparatus according to an exemplary embodiment of the present disclosure.

FIG. 1 is a block diagram of the configuration of an image processing apparatus according to the exemplary embodiment of the present disclosure.

The control unit 10 controls the operations performed by all of units of the image processing apparatus. The control unit 10 includes a central processing unit (CPU) 100, a local area network (LAN) 11, a communication unit 101, a random access memory (RAM) 102, a hard disk drive (HDD) 103, a read only memory (ROM) 104, a timer 105, and a facsimile (FAX) unit 106. The CPU 100 performs overall control of the control unit 10. The LAN 11 represents a network for exchanging data with external devices. The control unit 10 is connected to the Internet via the LAN 11. The communication unit 101 transmits and receives data via the LAN 11. The RAM 102 provides a system work memory for the CPU 100 to operate. The HDD 103 is a hard disk drive. The HDD 103 may be a storage medium, such as a magnetic disk, an optical medium, or a flash memory. The HDD 103 can store document data, setting data, and the like. Note that the HDD 103 need not be located in the image processing apparatus. An external server, a personal computer (PC), or the like may be used as the HDD 103 via the communication unit 101. The ROM 104 is a boot ROM, which stores a system boot program. The CPU 100 loads a program installed in the HDD 103 into the RAM 102 by using the ROM 104 serving as a boot ROM. Thus, the CPU 100 performs various control functions on the basis of the program. The timer 105 measures an elapse time in response to an instruction output from the CPU 100. If the specified time elapses, the timer 105 notifies the CPU 100 of the event by interruption or the like. The FAX unit 106 transmits and receives fax data through a telephone line 14.

The display/operation unit 12 is controlled by the control unit 10. The display/operation unit 12 includes a display unit 120 and an input unit 121. The display unit 120 is a display for displaying information on the image processing apparatus for a user. The input unit 121 receives input from the user through an interface, such as a touch panel, a mouse, a camera, a voice input, and a keyboard. Since the display unit 120 according to the present exemplary embodiment is a touch panel, "keys" and "buttons" described below are soft keys.

The image processing unit 13 is controlled by the control unit 10. The image processing unit 13 includes an image analysis unit 130, an image generation unit 131, and an image output unit 132. The image analysis unit 130 analyzes the structure of a document image and extracts necessary information from the result of analysis. The image generation unit 131 reads a document (for example, performs a scan function), digitizes the image of the document, generates image data, and stores the image data in the HDD 103. In addition, the image generation unit 131 can generate document image data in another format by using the information analyzed by the image analysis unit 130. The image output unit 132 outputs the image data stored in the HDD 103 or the like. For example, to output the image data, the image output unit 132 prints the image data on paper, transmits the image data to a network-connected external device, server, facsimile machine, or the like via the communication unit 101, or stores the image data in a storage medium.

Figure 2:
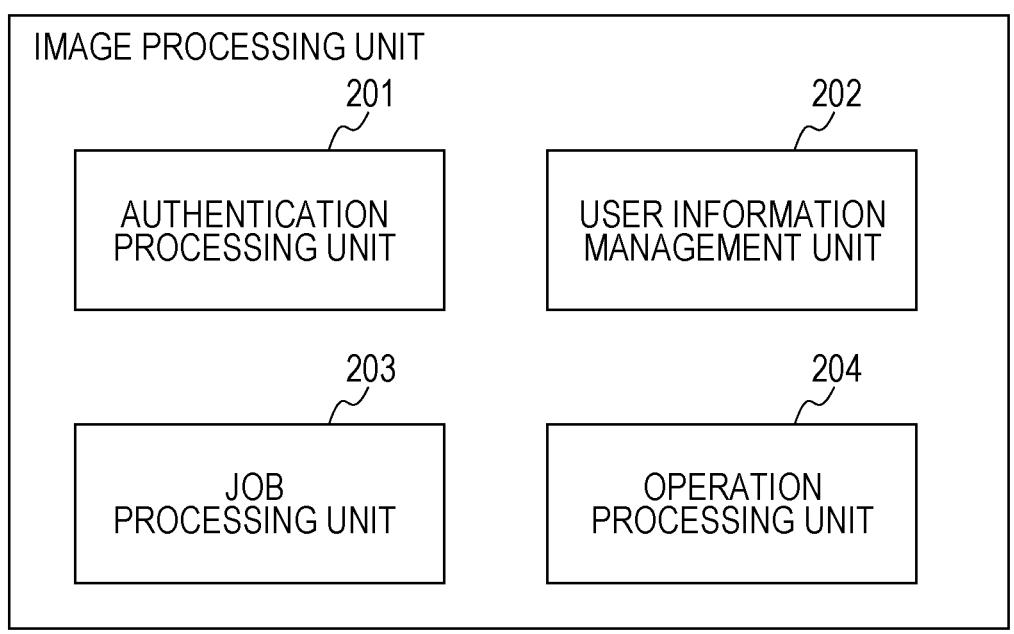
FIG. 2 is a block diagram illustrating an example of the functions of the image processing apparatus.

FIG. 2 is a block diagram illustrating an example of the functions of the image processing apparatus illustrated in FIG. 1. The image processing apparatus includes an authentication processing unit 201, a user information management unit 202, a job processing unit 203, and an operation processing unit 204 as its functions. Each of these functional units is a function provided by the CPU 100 that loads a program installed in the HDD 103 into the RAM 102 by using the ROM 104 serving as the boot ROM and that executes the program.

The authentication processing unit 201 receives and authenticates a login/logout request from a user and performs processing for managing the user who uses the image processing apparatus. The user information management unit 202 manages user information to be inquired about by the authentication processing unit 201. The job processing unit 203 processes a variety of jobs executed by the image processing apparatus. More specifically, the job processing unit 203 controls the image generation unit 131 to execute a scan job, controls the image output unit 132 to execute a print job, and controls the communication unit 101 to execute a transmission job. The operation processing unit 204 controls the display unit 120 to display various kinds of information for the user. Furthermore, the operation processing unit 204 receives an operation instruction input to the input unit 121 by the user and processes the operation instruction.

Figure 3:
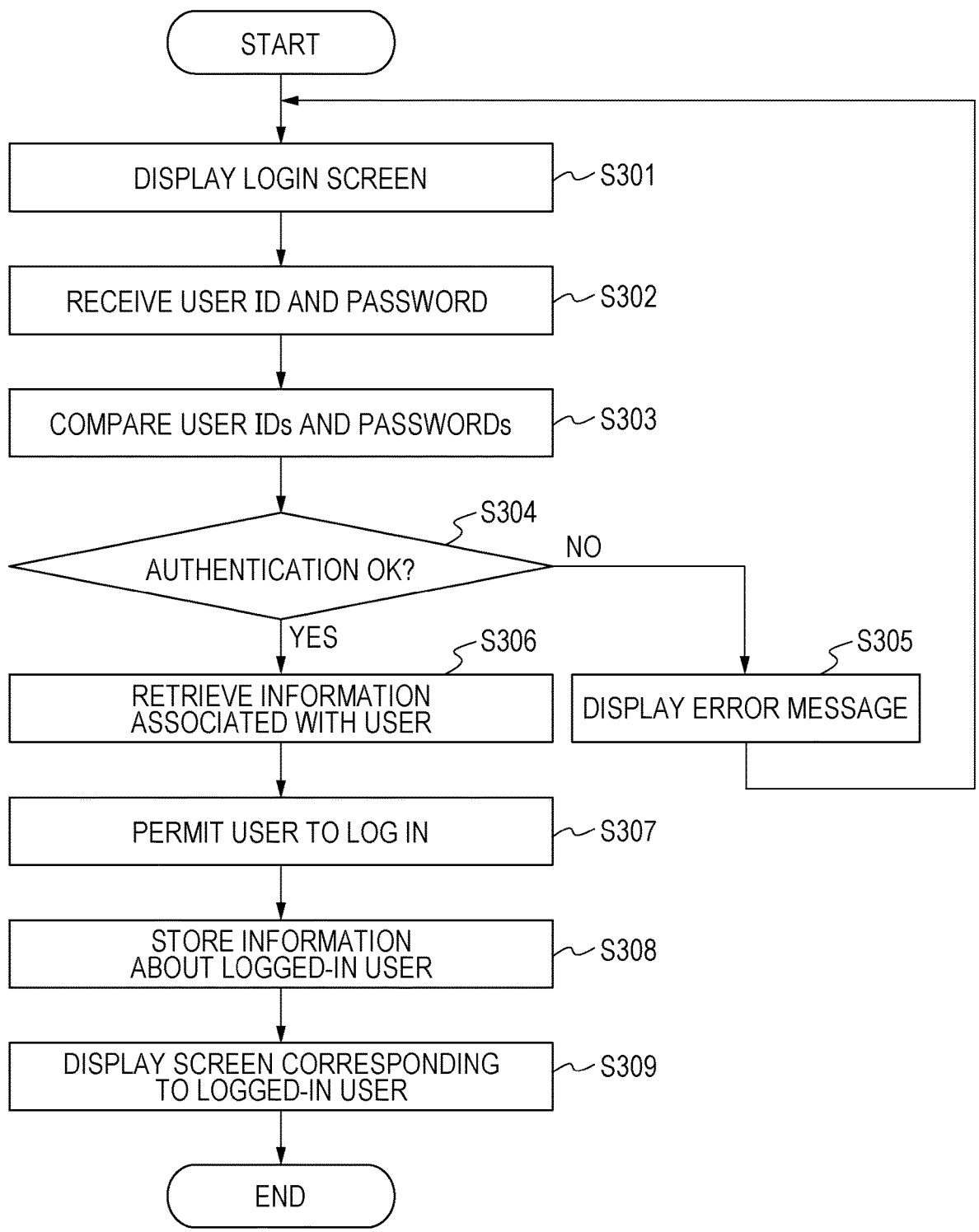
FIG. 3 is a flowchart illustrating an example of the processes performed after startup until a logged-in user screen is displayed.

The processing performed from when the image processing apparatus is activated until a logged-in user screen is displayed is described below with reference to FIG. 3. The processes in the flowchart illustrated in FIG. 3 are performed by the authentication processing unit 201, the user information management unit 202, the job processing unit 203, and the operation processing unit 204.

Figure 4:
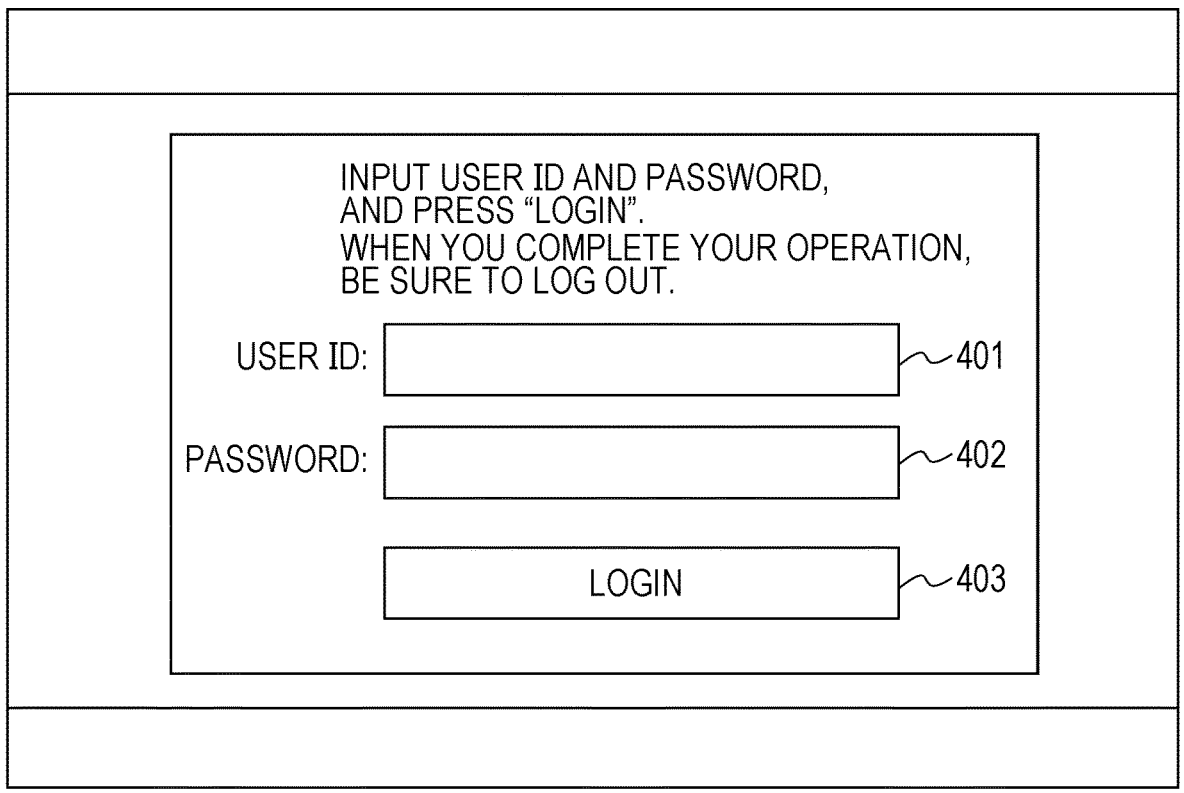
FIG. 4 is a schematic illustration of an authentication screen.

In step S301, the authentication processing unit 201 determines whether a login request has been made. The login request is made when a login screen (FIG. 4) is displayed on the display unit 120 and, thereafter, the user inputs an ID and password by using the input unit 121. FIG. 4 illustrates an example of a login screen displayed on the display unit 120. The user inputs a login user ID into a user ID input field 401 and inputs a password into the password input field 402 and, thereafter, presses a login key 403. In this way, the user makes a login request (step S302). Note that a login request may be made by an input to an IC card reading device or a biometric authentication device (e.g., a fingerprint authentication device) connected to the input unit 121 of the image processing apparatus.

Upon receiving the login request, the authentication processing unit 201 compares the input user ID and password with those stored in the HDD 103 and determines whether the input user ID and password match those stored in the HDD 103 (step S303). If, in step S304, the authentication processing unit 201 determines that a match is not found, the authentication processing unit 201 displays an error message on the display unit 120 via the operation processing unit 204 for a predetermined period of time (step S305). Thereafter, the authentication processing unit 201 displays the authentication screen displayed in step S301 on the display unit 120 via the operation processing unit 204 (step S301).

Figure 15A:
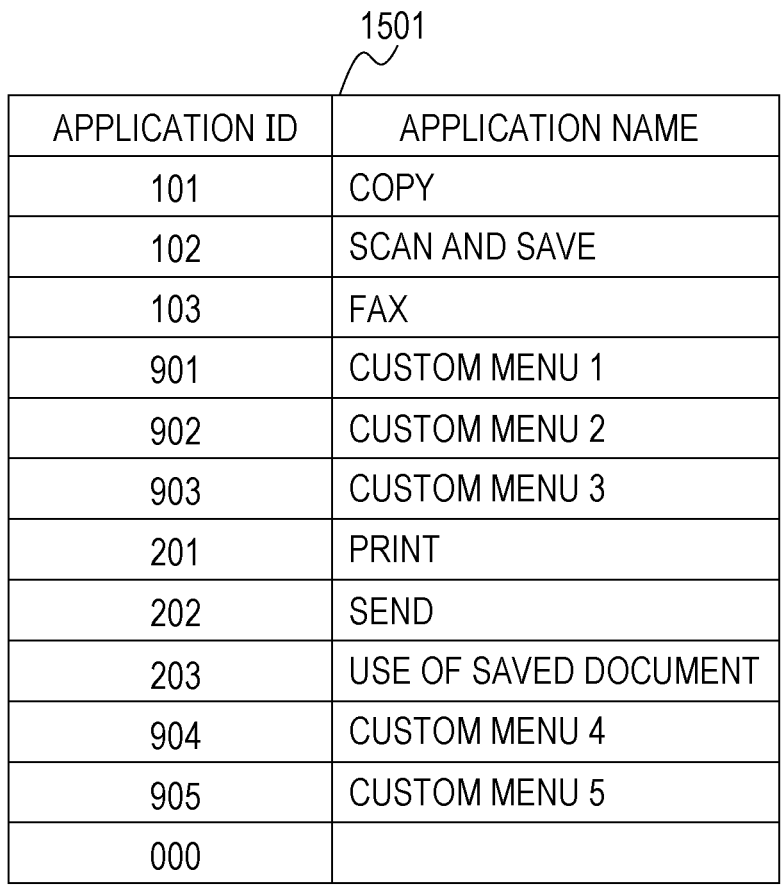
Figure 15B:
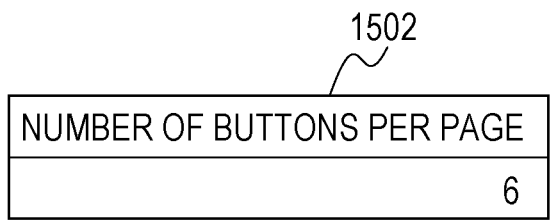

However, if, in step S304, the authentication processing unit 201 determines that a match is found for the input user ID and password, the user information management unit 202 retrieves information associated with the user stored in the HDD 103 (step S306). An example of the information associated with a user is information related to a button layout individually managed for the user. User Information FIGS. 15A to 15C illustrate an example of user information stored in the user information management unit 202. By referencing the information illustrated in FIGS. 15A to 15C, a home screen 542 corresponding to the logged-in user can be displayed.

Information 1501 includes an application ID for uniquely identifying an application and the application name of the application. Each of the applications corresponds to one of a plurality of functions that the image processing apparatus provide. Information 1502 indicates the number of application buttons or custom buttons that can be displayed per page of the home screen 542. As can be seen from the information 1501 and information 1502, six buttons can be arranged on the first page of the home screen 542. Accordingly, the home screen 542 includes the following six buttons arranged therein: "copy", "scan and save", "fax", "custom menu 1", "custom menu 2", and "custom menu 3".

As used herein, the term "custom button" refers to a soft key for displaying, as initial values, the settings set by the user as default values. If a custom button is selected, a displayed application screen (for example, a copy screen 700) includes the settings set by the user as default settings. In contrast, the application screens corresponding to the application buttons 501 to 503 are displayed so as to include the settings predetermined at the time of, for example, factory shipment.

Information 1503 relates to the custom buttons. The information 1503 includes a "custom menu ID" for uniquely identifying the custom button, application identification information "application ID" corresponding to the custom button, "application name" which is the name of the custom button, and "settings" which indicates the settings corresponding to the custom button. For example, in the case of "custom menu 1", since the application ID is 101, it can be seen that if "custom menu 1" is selected, the copy function is executed. In addition, it can be seen that the name of "custom menu 1" is "contract", and a job is executed in accordance with the copy settings "two copies, color, 2-sided, A4" if the custom button "custom menu 1" is pressed.

Referring back to the description of FIG. 3, if the retrieval of the information associated with the user is completed, the operation processing unit 204 permits the user to log in (step S307) and stores, in the HDD 103, the information about the user who is currently logged in (hereinafter referred to as a "logged-in user") (step S308). Thereafter, the operation processing unit 204 displays the home screen 542 based on the retrieved information about the logged-in user (step S309).

FIG. 5A is a display screen displayed using the user information about the logged-in user. The display screen includes a menu area 540 and a side menu area 541. In the menu area 540, the home screen 542 or an application screen (according to the present exemplary embodiment, the copy screen 700) is displayed. In the side menu area 541, an integrated history group 512, a number keypad 720, a guide menu, or the like is displayed. By selecting an application button or a custom button displayed in the home screen 542, the home screen 542 can be switched to the application screen.

A menu 500 used to start each of the applications is displayed in the home screen 542 corresponding to the logged-in user. The home screen 542 includes application buttons 501 to 503 used to start applications with default values and custom buttons 504 to 506 used to start applications with preset setting values. The custom buttons are displayed on the basis of the user information about the logged-in user.

A slider bar 507 is used to slide the current menu 500 to the menu 500 of another home screen 542. However, a technique for change the current menu 500 to the menu 500 of another home screen 542 is not limited thereto. For example, an operation of touching an arrow beside the slider bar 507 or an operation of flicking the menu 500 may be used. The operation processing unit 204 receives a user operation via the input unit 121 and retrieves, from the HDD 103, application buttons and custom buttons to be arranged in another home screen 542. Thereafter, the operation processing unit 204 displays the application buttons and custom buttons.

The user ID of the logged-in user of the current image processing apparatus is displayed in an area 508. According to the present exemplary embodiment, the case where the user logs in with the name "John Doe" is described. A setting/registration button 509 in the area 508 is used to change or register the settings. Similarly, a home key 510 in the area 508 is pressed in order to display the home screen 542 illustrated in FIG. 5A. Currently, since the home screen 542 is displayed, nothing happens. However, for example, if the home key 510 is pressed with an application screen (e.g., the copy screen 700 illustrated in FIGS. 7A to 7C) displayed, the screen returns to the home screen 542.

In addition, a display switching button 511 is displayed. By using the display switching button 511, the display format of the side menu area 541 can be switched. In FIG. 5A, history buttons of jobs executed by the logged-in user are displayed as an integrated history group 512. By pressing the display switching button 511, the integrated history group 512 is sorted by a particular condition or is hidden.

An integrated history group 512 is displayed, which is an area used to automatically register and display, as the history, the settings of application jobs executed by the image processing apparatus (executed jobs) in the form of history buttons. In the integrated history group 512, only the history buttons of jobs executed by the logged-in user are displayed. If the logged-in user has never executed a job or if the logged-in user deletes the history buttons of the integrated history group 512, the integrated history group 512 is not displayed. The operation and display of the integrated history group 512 are executed by the operation processing unit 204 on the basis of the program for the integrated history group 512 stored in the HDD 103. In addition, data used when displaying the integrated history group 512 is stored in the RAM 102 or the HDD 103.

An example of starting an application by pressing an application button or a custom button on the home screen 542 and executing a job is described below with reference to the flowchart illustrated in FIG. 6. Suppose that the copy application is selected from the menu 500 by the user. Then, the operation processing unit 204 receives copy selection information, calls a copy application from the HDD 103, and displays the copy screen 700 on the display unit 120, as illustrated in FIGS. 7A to 7C (step S601). The operation and display of the application are executed by the operation processing unit 204 on the basis of the application program in the HDD 103. In addition, data used by each of applications is stored in the RAM 102 or the HDD 103 in association with the application.

The copy screen 700 includes an area 701 used to display settings (i.e., the color, copy ratio, paper size, and number of copies), buttons for setting, and the like. A button 702 is used to display a preview of the current settings. If the button 702 is pressed, a preview screen based on the settings currently set in the copy screen 700 is displayed.

The copy screen 700 includes a color selection button 703, a copy ratio setting button 704, a paper selection button 705, a finishing button 706, a 2-sided button 707, a density button 708, a document type button 709, and an ID card copy button 710. Other copy functions can be set via a screen (not illustrated) which is to be displayed by pressing the other functions button 711. The setting history button 712 is used to display the history of settings that have been used at least once (in this case, the settings of a copy function). A button 713 is a button used to display a screen (not illustrated) for registering, retrieving, and editing the settings set in the copy screen 700 as favorite (frequently used) settings. If the user uses the same settings each time or if the user wants to keep complicated settings, the user can register the settings as "favorite settings".

A user can recognize whether the integrated history group 512 displayed on the home screen 542 is in a hidden mode by viewing a display switching button 511. The words "Integration history not displayed" on the display switching button 511 indicates that the integrated history group 512 is in a hidden mode. In this case, a number keypad 720 is displayed instead of the integrated history group 512. The number keypad 720 is used to input a numerical value, such as the number of copies, for setting. A stop key 721 is used to stop the operation in progress. A start key 722 is used to instruct the job processing unit 203 to send, to the image processing unit 13, an instruction to perform a copy operation in accordance with the current settings.

FIG. 7A illustrates the settings indicating that the color is black and white, the copy ratio is 100%, the paper size is automatic, the number of copies is 1, and sorting is set to YES. Assume that these settings are changed to "2 copies", "color", and "2-sided", as illustrated in FIG. 7B. Thereafter, the start key 722 is pressed (step S602). Then, the job processing unit 203 instructs the image processing unit 13 to read a document with a scanner. After the reading is completed, the image processing unit 13 generates an output image. At this time, the image processing unit 13 applies the settings illustrated in FIG. 7B to the output image and performs a copying operation of the input document (step S603). Simultaneously with the execution of the job, the job processing unit 203 saves the current copy function settings (FIG. 7B) in a copy-function memory area of the HDD 103 (step S604).

If the history button is pressed to display the corresponding application screen and, thereafter, the screen is returned to the home screen 542 without executing the job, a new history button is not generated. That is, the operation that triggers the generation of a history button is a job execution instruction.

FIGS. 8A and 8B illustrate a setting data table stored in the copy-function memory area of the HDD 103. A first row (a row 802) of the data table includes default setting values of the copy function, and the settings of the job currently executed are additionally stored in a second row (a row 803). In FIG. 8A, the settings in the row 802 correspond to the settings illustrated in FIG. 7A, and the settings in the row 803 correspond to the settings illustrated in FIG. 7B.

A process for generating a history button to be displayed in the integrated history group 512 is described below with reference to the flowchart illustrated in FIG. 9. In this case, the history button is generated after the job execution is completed. However, the time when the history button is generated is not limited thereto. For example, the history button may be generated at or after the time when the user presses the start key 722.

After the execution of the job is completed, the operation processing unit 204 acquires the data of the integrated history group 512 stored in the HDD 103 via the user information management unit 202 (step S901).

FIG. 10A illustrates a source data table from which the data is acquired in step S901. As can be seen from the data table, the data table stores the "button ID", "application ID", the "data", and one of raw data of the setting values set by the application, and text data indicating a pair consisting of "date and time" and "setting value". "Button ID" is an ID for identifying a history button registered in the integrated history group 512. "Application ID" is an ID for identifying the application executed in a job corresponding to the history button registered in the integrated history group 512. The application ID of the management application of the image processing apparatus itself is "100". The ID of the copy application is "101". The ID of the transmission application is "202". In this manner, an application ID is predetermined for each of the applications. The data type identifies the type of data described later.

"Data" in FIGS. 10A and 10B is raw data of the settings of a job executed by the application. For example, the raw data for the copy application includes all the functions and setting values set by the application, such as the number of copies, color, and paper size. The format of the raw data may be any format that can be read by the application.

"Display text" in FIGS. 10A and 10B is textual information to be displayed on the history button identified by the button ID. In the textual information, "date and time" is the date and time when the job is executed or when the application detects the state of the image processing apparatus itself or the state of the job and is displayed on the history button in the integrated history group 512. The display text "setting value" is a distinctive message that indicates the distinctive settings selected from among the settings of the executed job or the distinctive message that represents the state of the apparatus itself detected by the application or the state of the job. The display text is displayed on the history button in the integrated history group 512. Examples of a technique for selecting the "setting value" of the display text from among the job settings include a technique in which the setting item to be selected as the "setting value" is determined in advance, a technique in which the setting values are compared with the setting values of other jobs and nonoverlapped setting values are determined as "setting values" of the display text, and a technique in which the setting values changed from the default setting values are determined as "setting values". The "display text" in FIGS. 10A and 10B plays an important role when a history button exhibits its feature in the limited display area of the history button.

Referring back to FIG. 9, the operation processing unit 204 acquires all the data of the history buttons having the same application ID from the data table (FIGS. 10A and 10B) of the integrated history group 512 (step S901).

The operation processing unit 204 compares the data acquired in step S901 with the settings of the job currently executed and determines whether a history button having settings the same as those of the job currently executed is present in the integrated history group 512 (step S902). The reason for performing the comparison in step S902 is to avoid a situation where history buttons having the same settings are present in the integrated history group 512 and, thus, more effectively utilize a limited area of the integrated history group 512. If it is determined that there is no history button having settings the same as those of the executed job in the integrated history group 512, the operation processing unit 204 generates the display text to be displayed on a history button (step S903).

Figure 11:
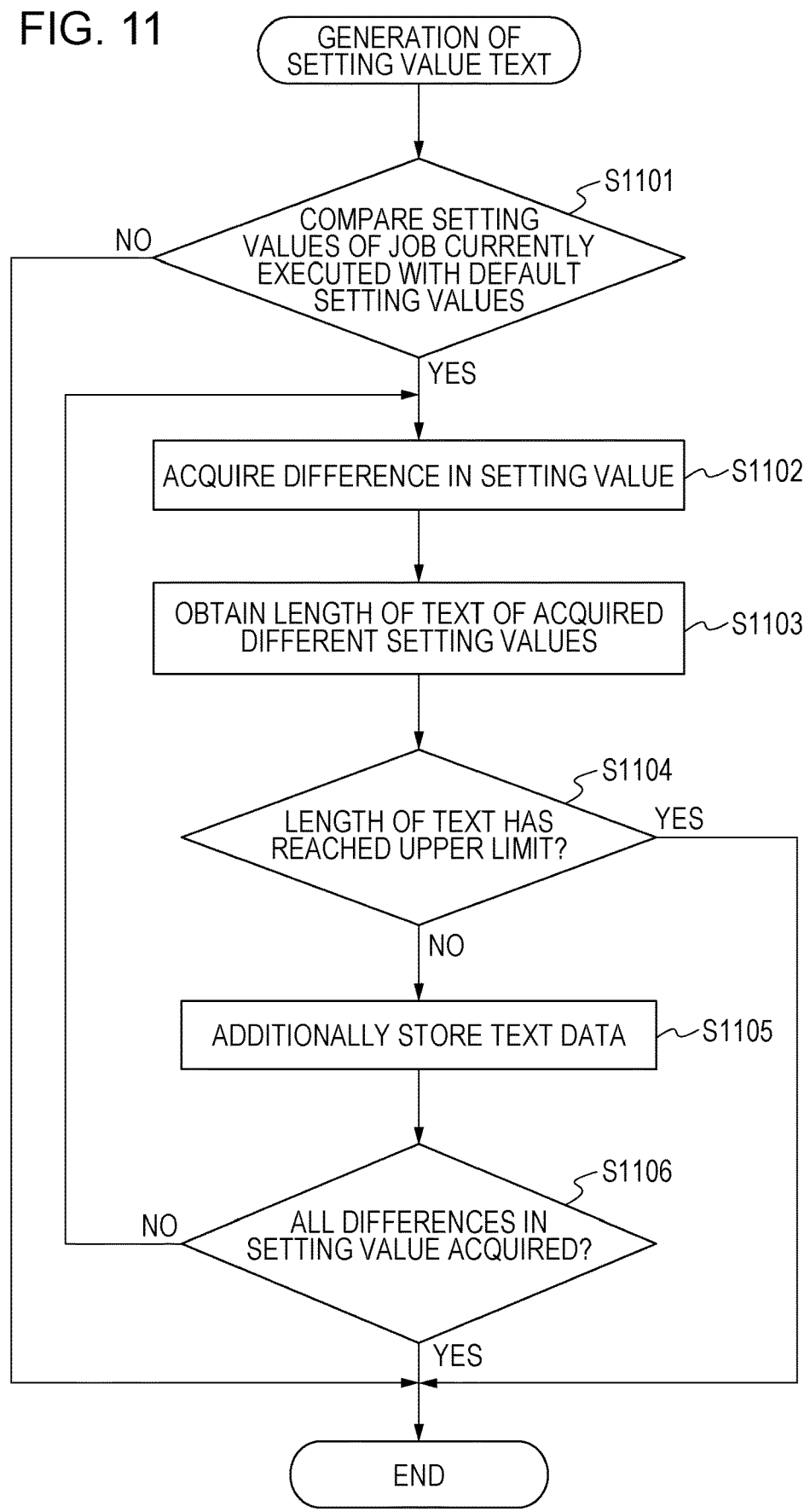
FIG. 11 is a flowchart illustrating an example of generation of text of setting values.

The display text generation processing performed in step S903 is described below with reference to the flowchart illustrated in FIG. 11. The operation processing unit 204 compares the setting values of the job currently executed with the default setting values (step S1101). In the comparison performed by the operation processing unit 204, the setting items illustrated in FIG. 8A are sequentially compared from the left to right. If, as a result of comparison, one or more different setting items are found, the operation processing unit 204 acquires the setting values for the different setting items (step S1102). The reason for selecting the setting value on the basis of the difference from the default setting value is that the setting item that the user intentionally changes is likely to be more distinctive than the other setting items. In this case, from among the setting values illustrated in FIG. 8A, the values of "number of copies", "color selection", and "2-sided" are acquired as a difference in setting value in step S1102.

The operation processing unit 204 obtains the length of the text (step S1103). Since there is an upper limit on the length of the character string that can be displayed on the history button, the operation processing unit 204 determines whether the length of the character string of the setting values acquired in step S1102 has reached the upper limit (step S1104). If it is determined that the upper limit has been reached, the display text generation process ends without adding the text data. However, if it is determined that the upper limit has not been reached, the operation processing unit 204 adds, as display text to be displayed on the history button, the read text data to the information illustrated in FIGS. 8A and 8B (step S1105).

The operation processing unit 204 determines whether all the differences in setting value have been acquired (step S1106). If there is a difference in setting value that has yet not been acquired, steps S1102 to S1105 are repeated. However, if all the differences in setting value have been acquired, the processing ends. Even before the upper limit of the length of the character string on the history button is reached, the processing ends if all the differences in setting value are acquired.

In the case illustrated in FIG. 8A, the setting value "2-sided" is the last difference in setting value to be acquired. As a result of execution of the processing illustrated in FIG. 11, the setting values "2 copies, color, 2-sided" of the setting items "number of copies", "color selection", and "2-sided" are the display text to be displayed on the history button. For example, if the length of character string "2 copies, color, 2-sided" exceeds the upper limit of the character string and if the length of character string "2 copies, color" does not exceed the upper limit of the character string, only the character string "2 copies, color" is displayed on the history button. As described above, the processing illustrated in FIG. 11 is performed.

Referring back to FIG. 9, when the processing for generating the setting value display text is completed in step S903, the operation processing unit 204 stores, as data1.xml, the application ID of the job to be executed and the current settings stored in the HDD 103 in step S604 illustrated in FIG. 6. At the same time, the operation processing unit 204 stores, in the HDD 103, the generated setting value display text (the setting values, job execution date and time) and information indicating the presence/absence of existing data. Thereafter, the operation processing unit 204 transmits the setting value display text and the information to the integrated history group 512 executed by the operation processing unit 204 (step S904). The information indicating the presence/absence of existing data corresponds to the value indicating the result of determination made in step S902.

Figure 12:
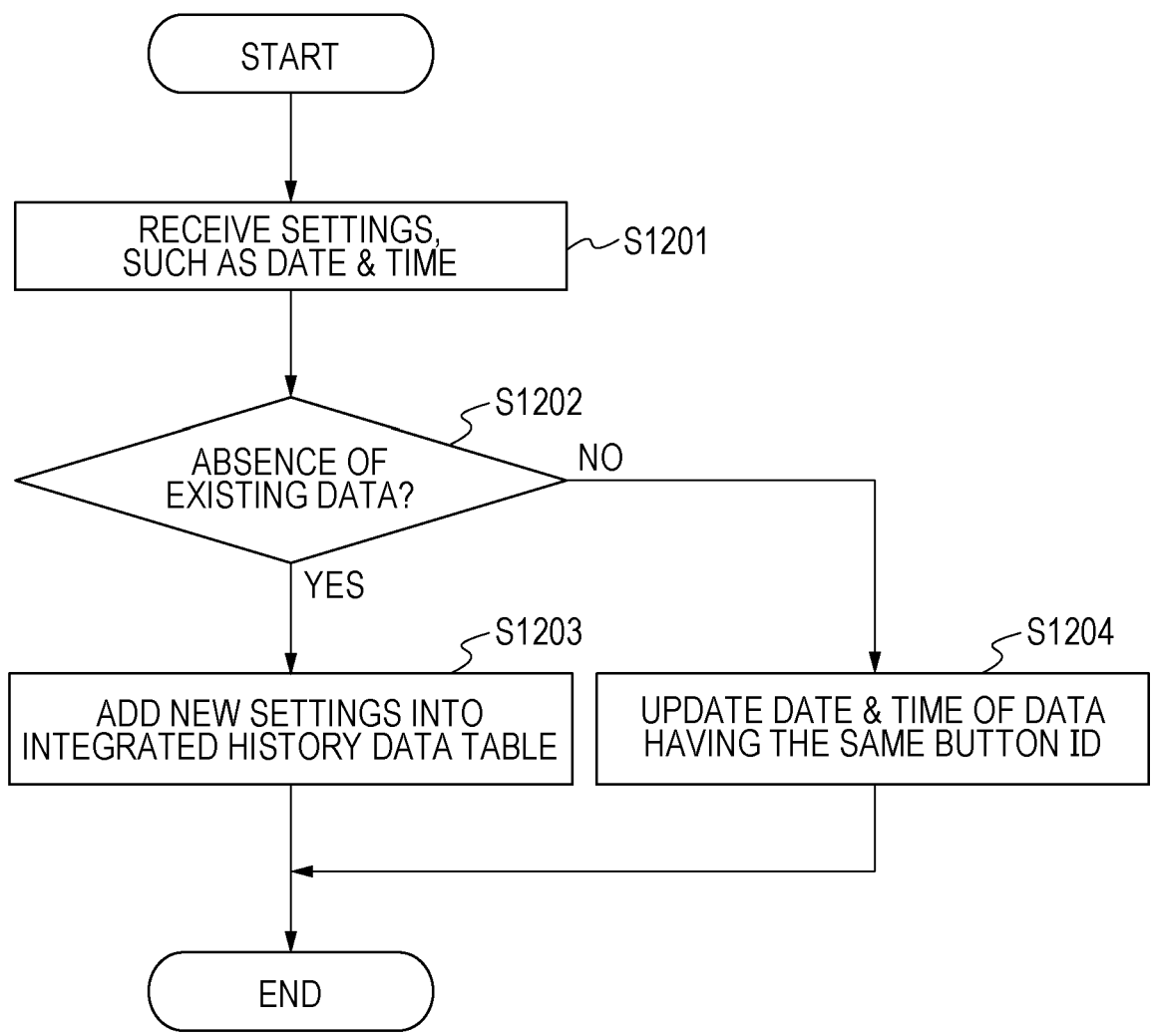
FIG. 12 is a flowchart illustrating an example of the process for displaying a history in the integrated history group.

A process for displaying a new history button or updating an existing history button is described below with reference to FIG. 12. The flow is executed after the display text generation processing (FIG. 9) ends.

Figure 9:
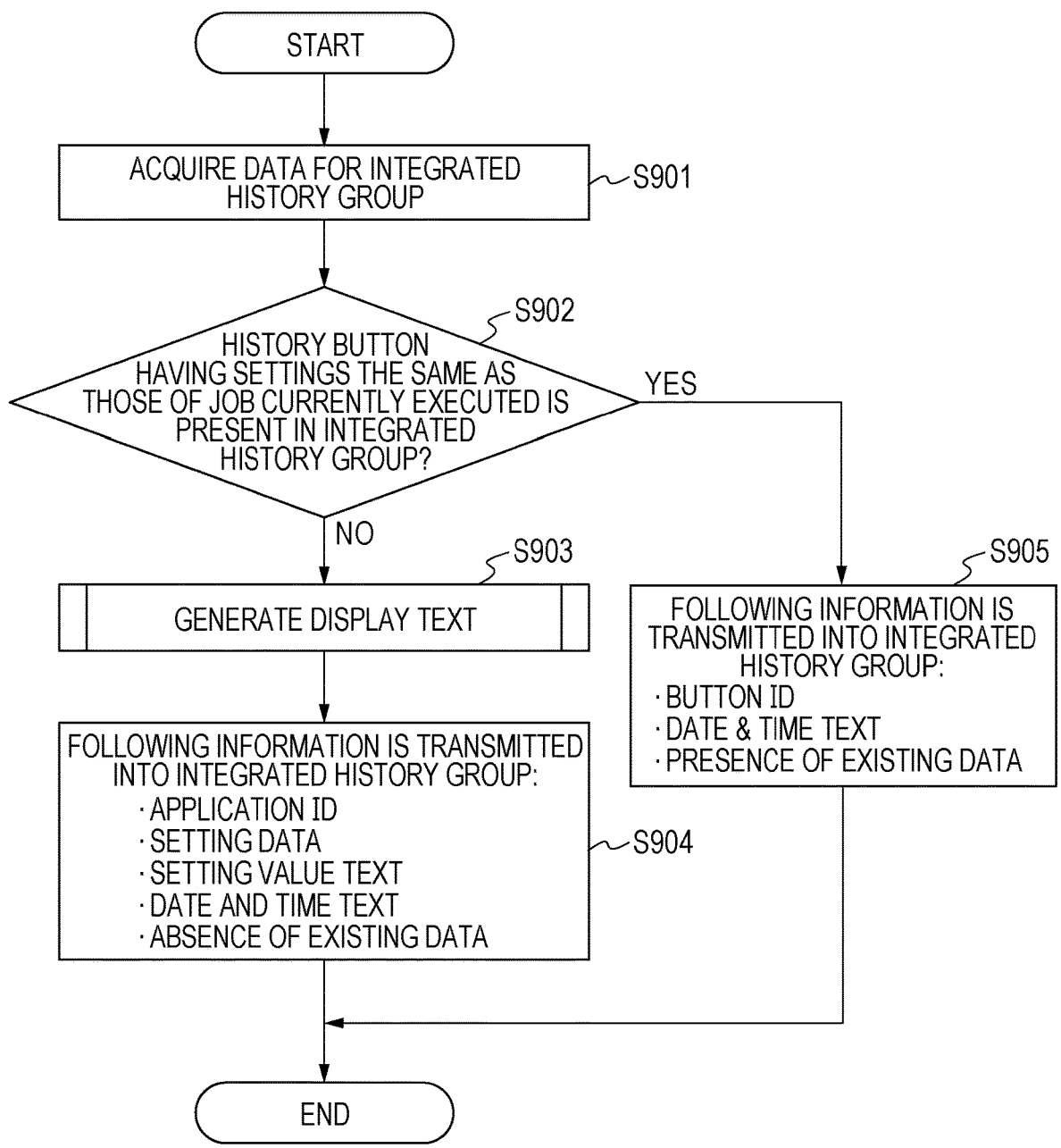
FIG. 9 is a flowchart illustrating an example of generation of information to be displayed in an integrated history group.

The operation processing unit 204 receives the settings stored in the HDD 103 in step S904 illustrated in FIG. 9 (step S1201). The operation processing unit 204 determines whether existing data is present or not on the basis of the received settings (step S1202). If the operation processing unit 204 determines that existing data is not present, the operation processing unit 204 adds the settings received from the application in step S1201 to the data table (FIGS. 10A and 10B) for the integrated history group 512 (step S1203). The newly added settings are illustrated as data 1002 in FIGS. 10A and 10B. However, if, in step S1202, the operation processing unit 204 determines that existing data is present, the operation processing unit 204 updates only the job execution date and time "Date and Time" without adding the settings to the data illustrated in FIGS. 10A and 10B (step S1204).

Figure 5B:
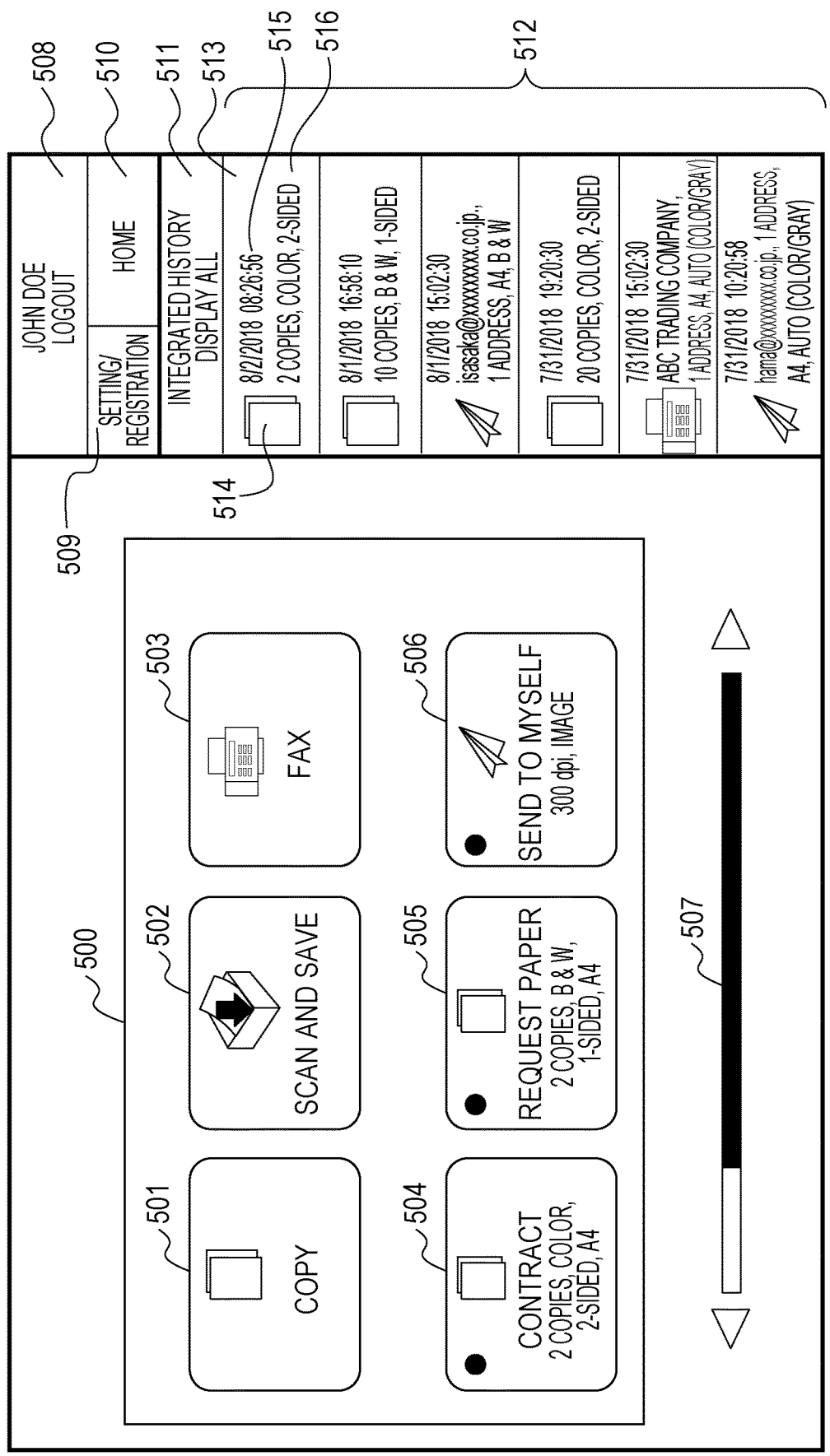

An example of a history button 513 newly added through the processing illustrated in FIG. 9 is illustrated in FIG. 5B. On the added history button 513, an application button 514 identified on the basis of the application ID, a job execution date and time 515, and a display text 516 representing the difference from the default settings are displayed. As described above, the new history button generation processing and history button update processing are performed.

Processing from When History Button IS Pressed Until Application IS Called

A flow from when a history button in the integrated history group 512 is pressed until the application is called is described below with reference to FIG. 13.

If the user presses the history button 513 illustrated in FIG. 5B, the data identified by the button ID of the pressed history button is read from the data table for the integrated history group 512 (FIGS. 10A and 10B) (step S1301). The integrated history group 512 identifies the target application from the application ID in the read data and transmits the setting data to the application (step S1302). Since the history button 513 is a history button representing a copy function, the setting data is transmitted to the copy application.

The copy application executed by the operation processing unit 204 reads, from the received setting data, the setting values of various setting items and displays, on the display unit 120, an application screen including the setting data (step S1303). FIG. 7B is an example of an application screen based on the settings indicated by the history button 513.

The settings in the application screen displayed when the history button is pressing can be changed in the same manner as when the application button 501 or the like is pressed. For example, if the number of copies to be printed is changed from "2 copies" to "5 copies" and, thereafter, the job is executed, the job processing unit 203 changes the settings at the time of job execution and overwrite-saves the settings, as indicated by the second line (Line 804) in FIG. 8B (step S604). Subsequent processing is the same as that in FIG. 9 and FIG. 12. Since the history buttons in the integrated history group 512 are sorted by job execution date and time in descending order and are displayed, the history button of the newly executed job is added to the top of the integrated history group 512.

An operation similar to the operation for the copy application is performed when the user executes a job using another application. For example, when the user executes a job using the transmission application, the operation processing unit 204 stores the settings of the executed job in the transmission application data table (FIG. 14) in the HDD 103. A header 1401 of the data table illustrated in FIG. 14 represents the setting items stored for the transmission application. A first row 1402 of the table stores the default settings of the transmission application. A hyphen as a setting value indicates that a setting value is not specified. The second row 1403 stores the settings of the job currently executed. Even in the case of the transmission application, like the above-described copy application, data necessary for the integrated history group 512 is registered through the flow illustrated in FIGS. 9 and 11 and is stored in the data table for the integrated history group 512, as illustrated in FIGS. 10A and 10B. In this case, as can be seen from FIG. 14, even when there is a difference from the default setting regarding the resolution, the display text on the history button may not include the resolution setting value. The reason is that the upper limit of the length of the display text on the history button is reached and, as a result of executing of the flow in FIG. 11, the setting value is not included in the display text on the history button. A setting value that is not included in the display text on a history button may be deleted from the history button. Alternatively, an indicator, such as " . . . ", may be appended to the end of the display text to indicate the presence of a setting value not included in the display text.

In addition, if the user selects the history button of the transmission application, the transmission application is called, and an application screen based on the settings of the selected history button is displayed.

Screen for Display Setting of Integrated History Group

Figure 16:
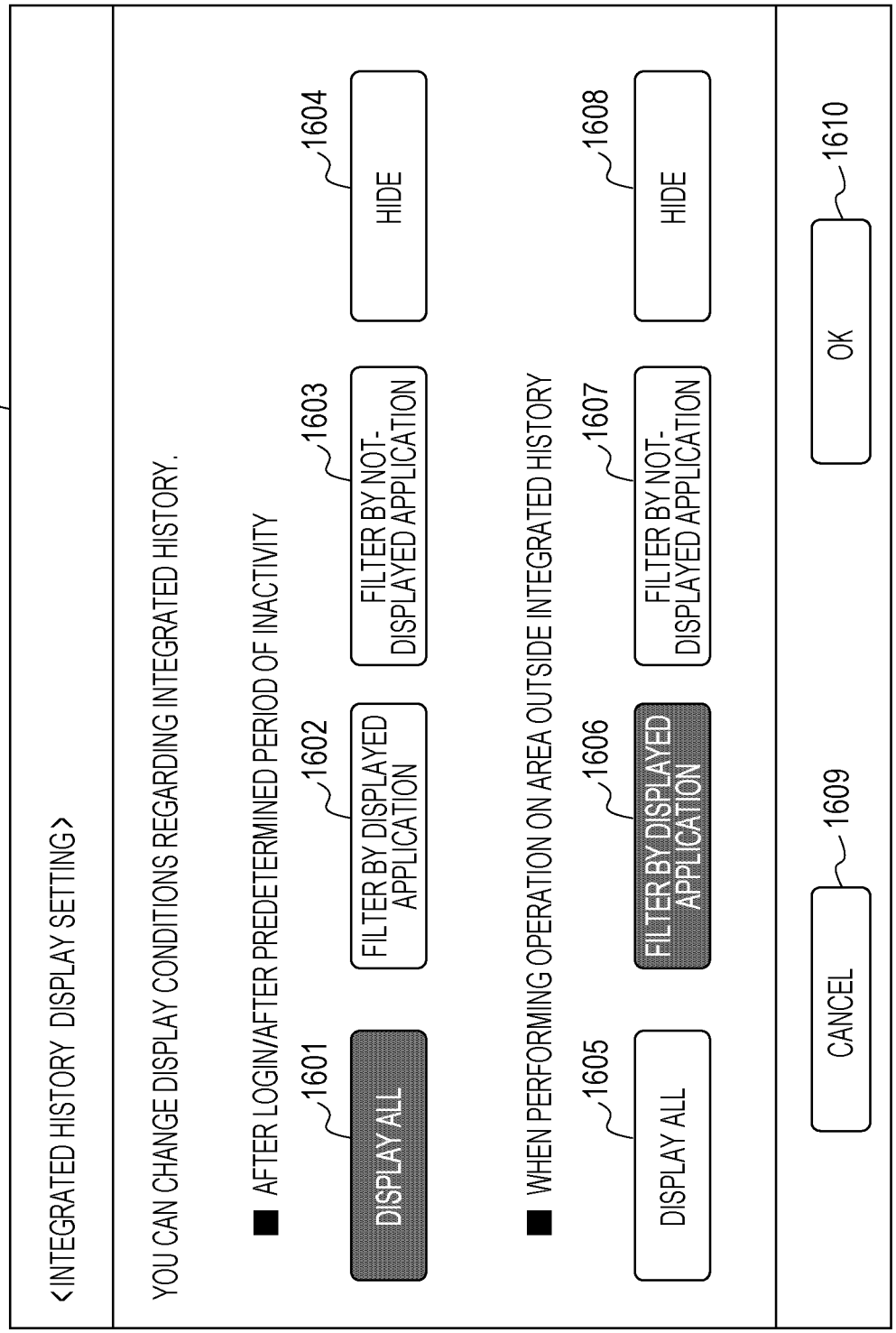
FIG. 16 is a schematic illustration of an integrated history display format setting screen.

FIG. 16 illustrates a display setting screen 1600 used to set the display conditions for the integrated history group 512. By using selection keys 1601 to 1604, the display format of the integrated history group 512 after login or after a predetermined period of inactivity of operations on the display/operation unit 12 can be determined. One of "Display all", "Filter by displayed application", "Filter by not-displayed application", and "Hide" can be selected. "Display all" is a setting for displaying all history buttons without filtering the integrated history group 512. Even when "Display all" is selected, the upper limit applies to the number of history buttons displayed on the integrated history group 512.

"Filter by displayed application" is a setting for displaying, in the integrated history group 512, only history buttons related to the application buttons being displayed in the home screen 542. "Filter by non-displayed application" is a setting for displaying only history buttons not related to the application button being displayed. "Hide" is a setting for switching the current integrated history group 512 to a display format other than a history button format without displaying any history button or a setting for display nothing.

By using selection keys 1605 to 1608, the display format of the integrated history group 512 displayed when an area outside the integrated history group 512 is operated can be determined. As used herein, the statement "an area outside the integrated history group 512 is operated" means that for example, the application button or the custom button is pressed and, thus, an application screen is displayed. The functions of the selection keys 1605 to 1608 are the same as the functions of the selection keys 1601 to 1604. In the example illustrated in FIG. 16, the setting "Display all" (1601) is selected for the case of "After login or after a predetermined period of inactivity", and the setting "Filter by displayed application" (1606) is selected for the case of "An area outside the integrated history group 512 is operated".

The settings illustrated in FIG. 16 are managed by the user information management unit 202 for each of logged-in users. FIG. 17 illustrates an example of the settings illustrated in FIG. 16 and managed by the user information management unit 202.

Processing for Switching Between Display Formats of Integrated History Group

Figure 18A:
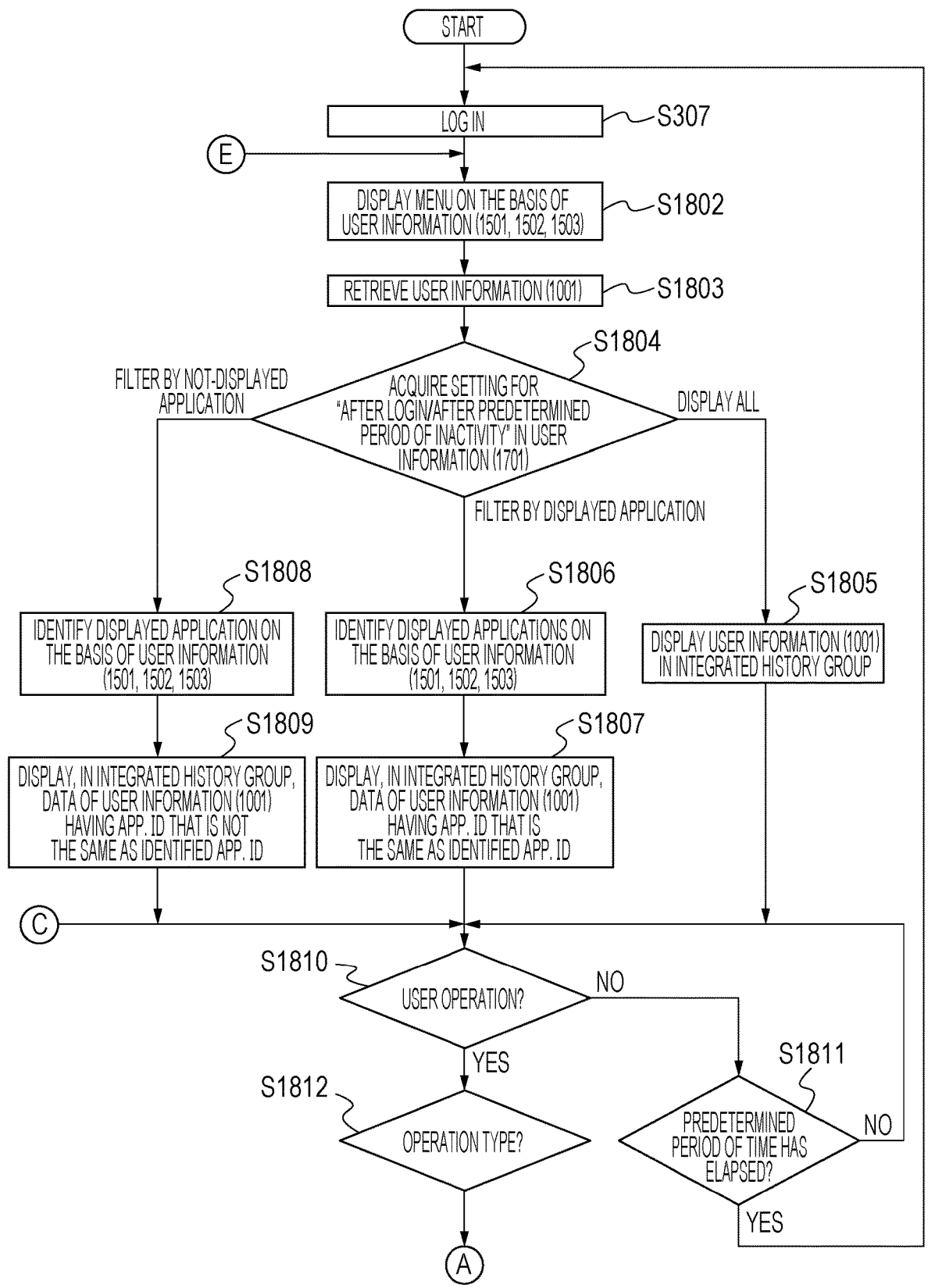
FIGS. 18A and 18B are a flowchart illustrating an example of the process performed until a displayed integrated history is switched by a user operation.
Figure 18B:
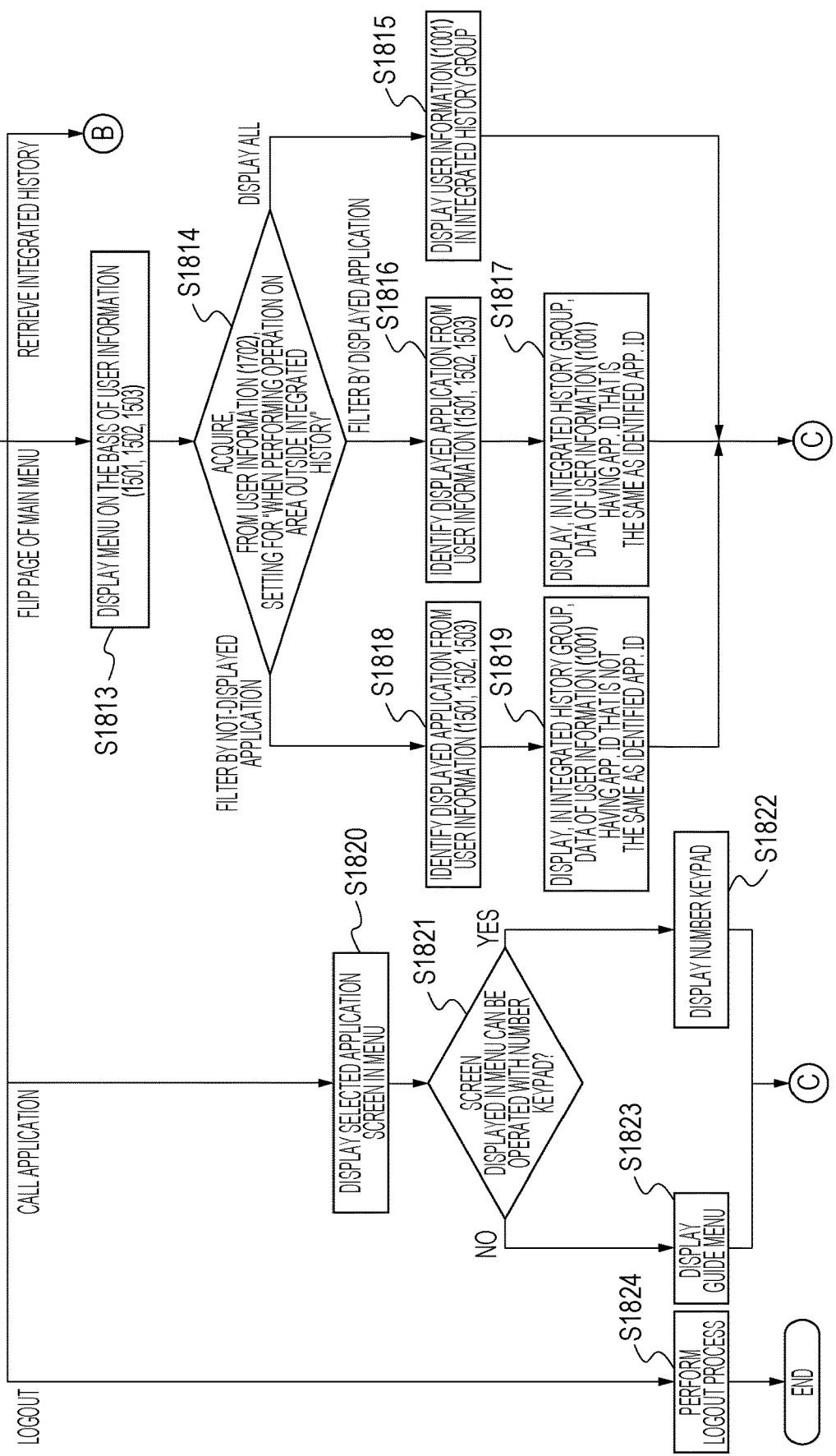

With reference to FIGS. 18A and 18B, an example of the processing is described which is performed from when the user logs in in step S307 and, thus, a screen is displayed on the basis of the logged-in user information in step S309 until the integrated history group 512 is switched by user operation. Note that the same reference numerals are used in FIGS. 18A and 18B to describe those processes that are identical to the processes described above, and description of the processes is not repeated.

After performing the login process in step S307, the operation processing unit 204 retrieves, from the user information management unit 202, the user information (1501, 1502, 1503) necessary for the layout of the buttons in the home screen 542 in step S1802. Thereafter, the operation processing unit 204 displays the menu 500.

In step S1803, the operation processing unit 204 acquires data 1001 for the integrated history group 512 of the logged-in user stored in the HDD 103 via the user information management unit 202. In step S1804, the operation processing unit 204 acquires, from the user information management unit 202, a setting 1702 for the setting item "After login or after a predetermined period of inactivity". In this example, as can be seen from FIG. 17, the setting 1702 is "Display all".

The operation processing unit 204 displays the integrated history group 512 on the basis of the data 1001 corresponding to the logged-in user acquired in step S1803.

In step S1804, the operation processing unit 204 determines whether the setting acquired from the information in FIG. 17 is "Filter by not-displayed application", "Filter by displayed application", or "Display all". If the setting acquired from FIG. 17 is "Filter by not-displayed application", the processing performed by the operation processing unit 204 proceeds to step S1808. If the setting is "Filter by displayed application", the processing proceeds to step S1808. However, if the setting is "Display all", the processing proceeds to step S1805. Accordingly, in the case of the setting illustrated in FIG. 17, the processing proceeds to step S1805, where the operation processing unit 204 displays history buttons on the basis of the data 1001. If there is an upper limit of the number of displayable history buttons, the history buttons less than or equal in number to the upper limit are displayed.

In step S1806, the operation processing unit 204 identifies the application ID of the application button other than the custom button displayed on the home screen 542 by using the user information (1501, 1502) acquired in step S1802. In step S1806, since application IDs of the application buttons other than the custom button are identified, application IDs of "101 (copy)", "102 (scan and save)", and "103 (fax)" are identified.

In step S1807, if there is a history button having an application ID that is the same as the application ID identified in step S1806 in the logged-in user data 1001 acquired in step S1803, the operation processing unit 204 displays only the history button in the integrated history group 512. A history button having an application ID that is not the same as the application ID is not displayed in the integrated history group 512.

The function related to the application button being displayed is a function that the user may select from now on. For this reason, by displaying only history buttons each having a function the same as that function in the integrated history group 512, the user need not search the integrated history group 512 for the corresponding history button.

If the setting of "Filter by not-displayed application" is acquired in step S1804, the operation processing unit 204 identifies the application ID in step S1808. The processing performed in step S1808 is the same as that in step S1806. According to the present exemplary embodiment, the application IDs "101 (copy)", "102 (scan and save)", and "103 (fax)" are identified.

In step S1809, if there is a history button having an application ID that is identified in step S1808 and that is not the same as the application ID in the logged-in user data 1001 acquired in step S1803, the operation processing unit 204 displays only the history button in the integrated history group 512. The history button having an application ID that is the same as the application ID in the logged-in user data 1001 is not displayed in the integrated history group 512.

The display area of the home screen 542 is limited. Accordingly, by displaying a history button having a function that differs from the function related to the application button, a greater number of functions can be selected from one home screen 542 by the user. In the manner described above, the process of displaying the integrated history group 512 is performed on the basis of the logged-in user information.

The processing performed in step S1810 and the subsequent steps is described below which switches between the display format of the integrated history group 512 in accordance with a user operation. In step S1810, the operation processing unit 204 determines whether there is a user operation. If there is no user operation, it is determined whether a predetermined period of time has elapsed (step S1811). If predetermined period of time has elapsed, the processing returns to step S307, where a login operation is accepted. However, if it is determined that the predetermined period of time has not elapsed, the processing returns to step S1810.

In step S1812, the user operation is analyzed. In this example, the information displayed in the integrated history group 512 has been changed after a predetermined period of time has elapsed in step S1811. However, the technique for changing the information displayed in the target area is not limited thereto. For example, the displayed information may be changed by the user manually.

Figure 13:
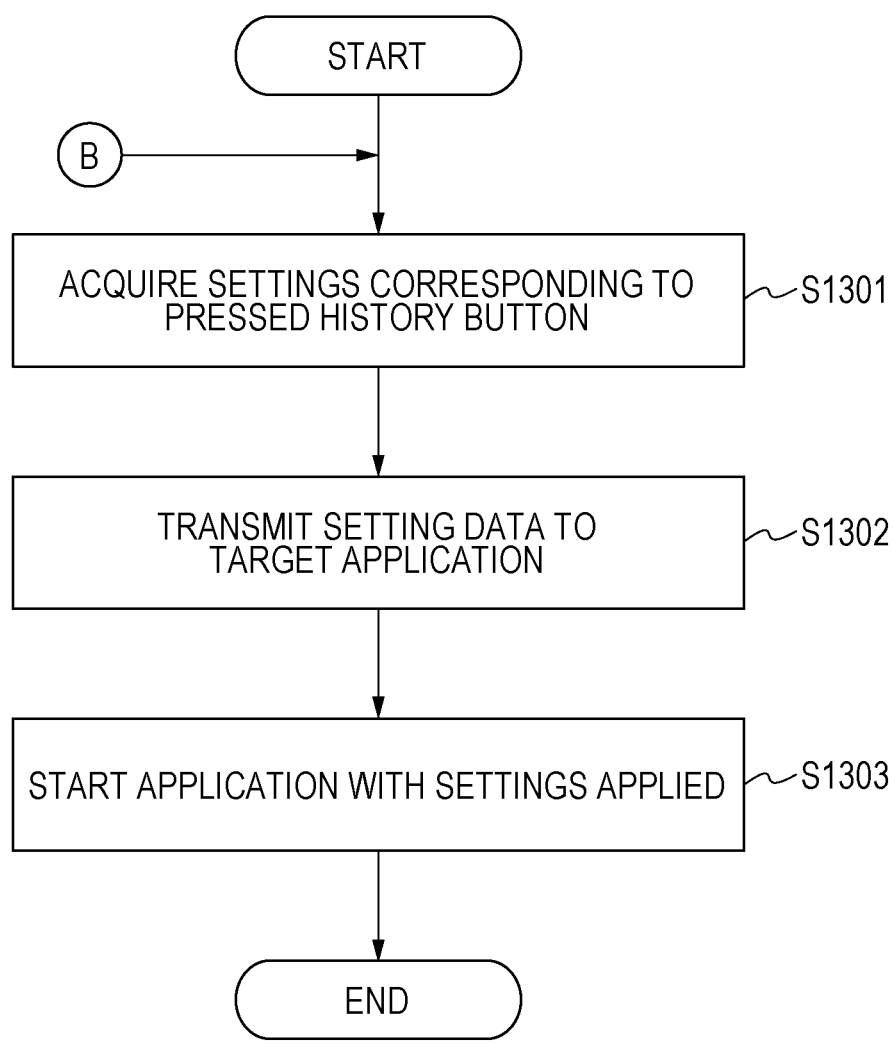
FIG. 13 is a flowchart illustrating an example of application call by using the integrated history group.

If, as a result of analysis of the user operation in step S1812, the operation processing unit 204 determines that the operation is a user operation performed on the integrated history group 512, the flow illustrated FIG. 13 is performed, and the application corresponding to the selected history button is called.

If, as a result of the analysis of the user operation in step S1812, the operation processing unit 204 determines that the operation is an operation to switch the current home screen 542 to the home screen 542 of another page, the processing proceeds to step S1813. Particular examples of an operation to switch the home screen 542 to the home screen 542 of another page include an operation to slide the slider bar 507, an operation to press an arrow beside the slider bar 507, and an operation to flick any point in the menu 500 and feed the page of the main menu.

In step S1813 and steps S1814 to 1819, a display screen including the menu 500 having the application buttons therein and the integrated history group 512 is displayed. According to the present exemplary embodiment, for convenience of description, the process for determining the information to be displayed in the menu 500 (step S1813) and the process for determining the information to be displayed in the integrated history group 512 (steps S1814 to 1819) are separate processes. However, the two processes may be integrated into a single process, or the execution order of the processes may be reversed.

In step S1813, the operation processing unit 204 displays, in the menu 500, the home screen 542 to be newly displayed (the home screen 542 of another page) on the basis of the user information (1501, 1502, 1503) acquired in step S1802, which is necessary for the button layout displayed in the home screen 542.

In step S1814, the operation processing unit 204 acquires, from the user information management unit 202, a setting 1703 for the setting item "WHEN PERFORMING OPERATION ON AREA OUTSIDE INTEGRATED HISTORY". If the setting 1703 is "Display all", the processing proceeds to step S1815, where the operation processing unit 204 displays the history buttons in the integrated history group 512 on the basis of the logged-in user data 1001 acquired in step S1803.

If, in step S1814, it is determined that "Filter by displayed application" is set, the processing proceeds to step S1816. Since the processing performed in step S1816 is the same as the processing performed in step S1806, detailed description of the processing is not given here. Unlike the processing performed in step S1806, the application IDs identified in step S1816 after the home screen 542 is switched to another home screen 542 are "201 (print)", "202 (send)", and "203 (use of saved file)" (custom buttons are excluded).

Since the processing performed in step S1817 is the same as the processing performed in step S1807, detailed description of the processing is not given here.

If "Filter by non-displayed application" is set in step S1814, the processing proceeds to step S1818. Since the processing performed in step S1818 is the same as the processing performed in step S1816, description of the processing is not repeated. In addition, since the processing performed in step S1819 is the same as the processing performed in step S1809, detailed description of the processing is not given here.

After steps S1815, S1817, and S1819 are performed, the processing proceeds to step S1810, where the operation processing unit 204 determines again whether there is a user operation.

Referring back to the description of step S1812, if, as a result of determining the user operation in step S1812, it is determined that the user operation is an operation to press an application button, the operation processing unit 204 displays the application screen corresponding to the pressed application button (step S1820).

In step S1821, the operation processing unit 204 determines whether the displayed application screen is a screen that allows the user to use a number keypad. Note that in step S1820 and steps S1821 to 1823, the display information in the menu 500, which includes application buttons, and the display information in the integrated history group 512 are determined. According to the present exemplary embodiment, for convenience of description, the process for determining the display information in the menu 500 (step S1820) and the process for determining the display information in the integrated history group 512 (steps S1821 to S1823) are separate processes. However, the processes may be integrated into a single process, or the execution order of the processes may be reversed. To determine whether the operation screen can be operated with a number keypad, a flag (not illustrated) indicating whether a number keypad can be used is provided for each of the types of screens, and the availability of a number keypad is determined on the basis of the flag.

If, in step S1821, it is determined that the screen can be operated with a number keypad, the number keypad 720 is displayed in the entire or part of the side menu area 541 (step S1822). However, if it is determined that the screen cannot be operated with a number keypad, a guide menu corresponding to the display information in the menu area 540 is displayed in the entire or part of the side menu area 541. FIG. 7A illustrates an example of a display screen when it is determined that a number keypad can be used for an operation. Examples of an operation that requires a number keypad include a printing operation for inputting the number of copies to be printed, a fax transmission operation for inputting a destination of a fax, and the like. After step S1822 or S1823 is performed, the processing returns to step S1810, where the operation processing unit 204 determines again whether there is a user operation.

If, as a result of analyzing the user operation in step S1812, it is determined that the user operation is for a logout process, the operation processing unit 204 performs the logout process and, thereafter, ends this processing.

While the present exemplary embodiment has been described with reference to the process for displaying the guide menu in the side menu area 541 in step S1823, the process is not limited thereto. The information related to the logged-in user's job may be displayed on a history button, or the information related to the total number of printed sheets may be displayed. Alternatively, the display area of the currently displayed application screen may be expanded to the display area of the number keypad 720.

As described above, the display information displayed in the integrated history group 512 can be changed on the basis of the predetermined setting of the display format of the integrated history group 512. In this manner, the home screen 542 having a limited area can be effectively used without increasing the number of operations performed by the user. To effectively use the area, the history buttons related to or not related to the application buttons and custom buttons in the home screen 542 or the number keypad and guide menu are displayed in the area. Selection of the information to be displayed depends on user's needs. Accordingly, it is designed such that the user can preset the information to be displayed in the integrated history group 512 or manually change the information to be displayed. Note that the technique of effectively displaying the information in the integrated history group 512 is applicable even when the home screen 542 is switched to the home screen 542 of another page.

Second Exemplary Embodiment

An operation for displaying the integrated history group 512 when a screen other than the home screen 542 is set as the initial screen is described below.

Figures 19, 20:
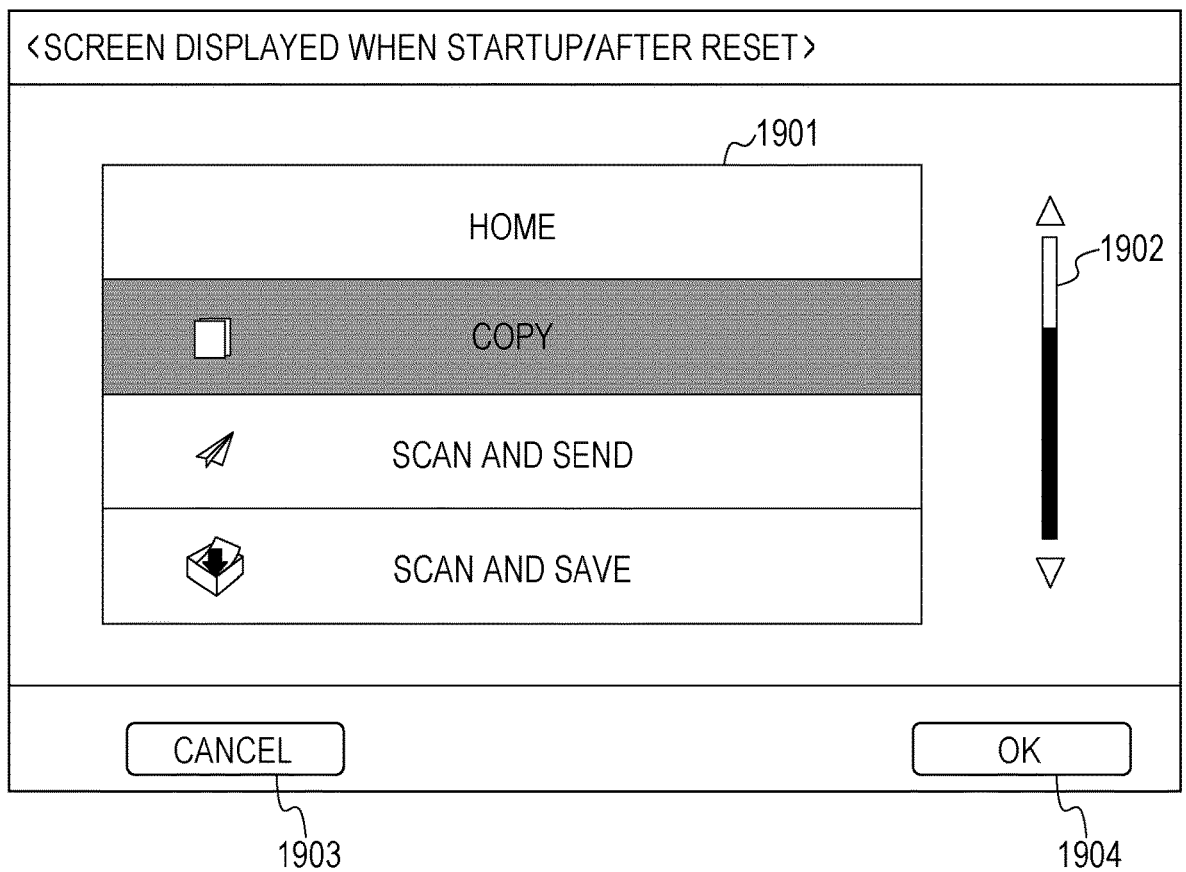
FIG. 19 is a schematic illustration of a screen displayed after startup/reset.
FIG. 20 is a diagram illustrating an example of a data table related to screen settings displayed after startup/reset.

FIG. 19 illustrates an example of a setting screen used to set user information to be stored in the user information management unit 202. The setting screen illustrated in FIG. 19 is an initial screen that is displayed immediately after the MFP is activated or reset and is used to set an initial screen that is displayed after a user is authenticated. The user selects a desired initial screen from a selection list 1901. The user can switch among the items in the selection list 1901 by pressing the slider bar 1902 or an arrow beside the slider bar 1902 or by flicking the selection list 1901. To cancel the setting, the user presses a cancel button 1903. To apply the setting, the user presses an OK button 1904. According to the present exemplary embodiment, description is made assuming that the initial screen is set to the "copy" application screen.

FIG. 20 illustrates an example of user information 2001 stored in the user information management unit 202. The information about the initial screen set in FIG. 19 is managed for each of users. As can be seen from FIG. 20, the initial screen displayed after the user having a user ID of "User0113" logs in is an application screen having an application ID of "101".

Figure 21A:
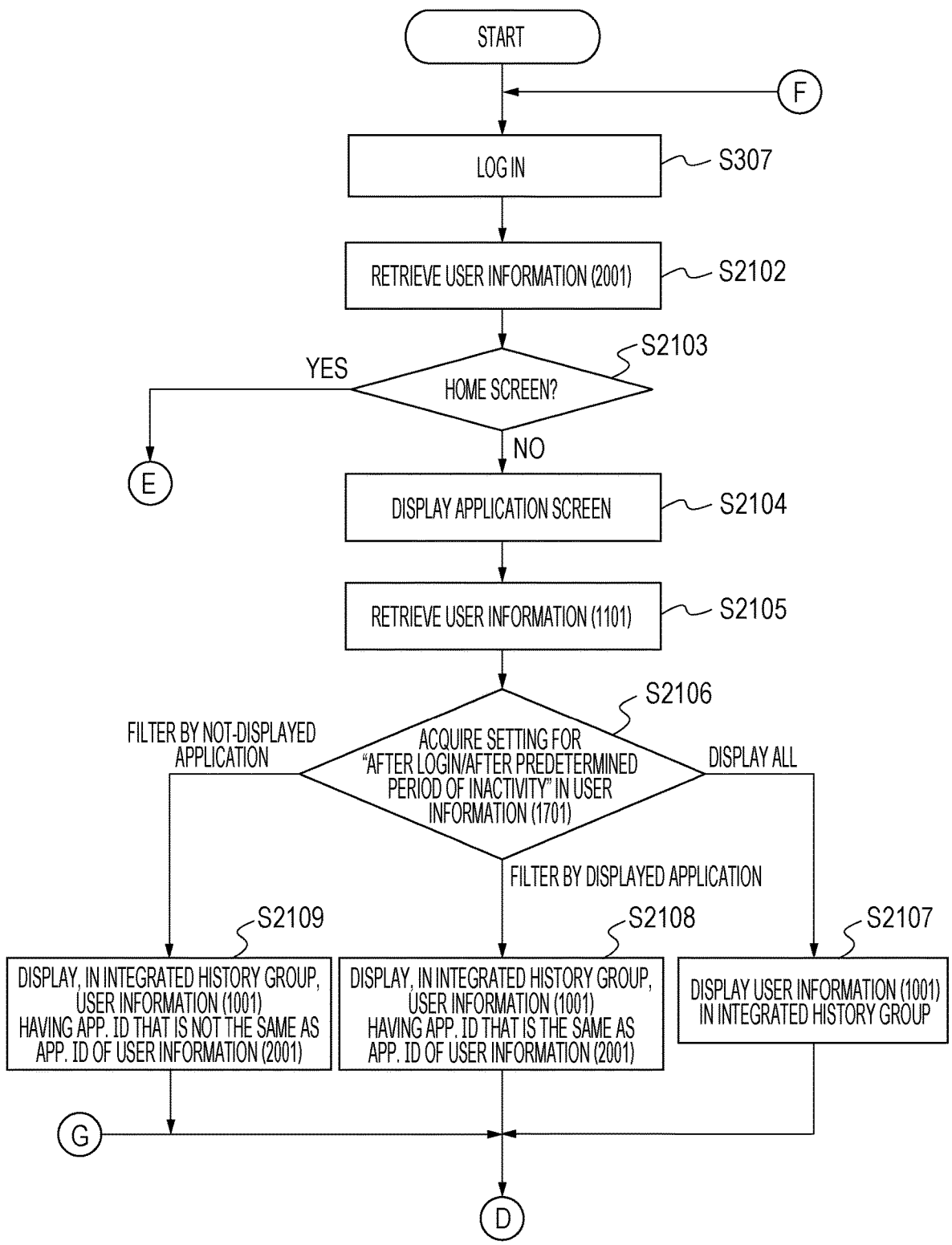
FIGS. 21A and 21B are a flowchart illustrating an example of the processes performed until a displayed integration history is switched by a user operation.
Figure 21B:
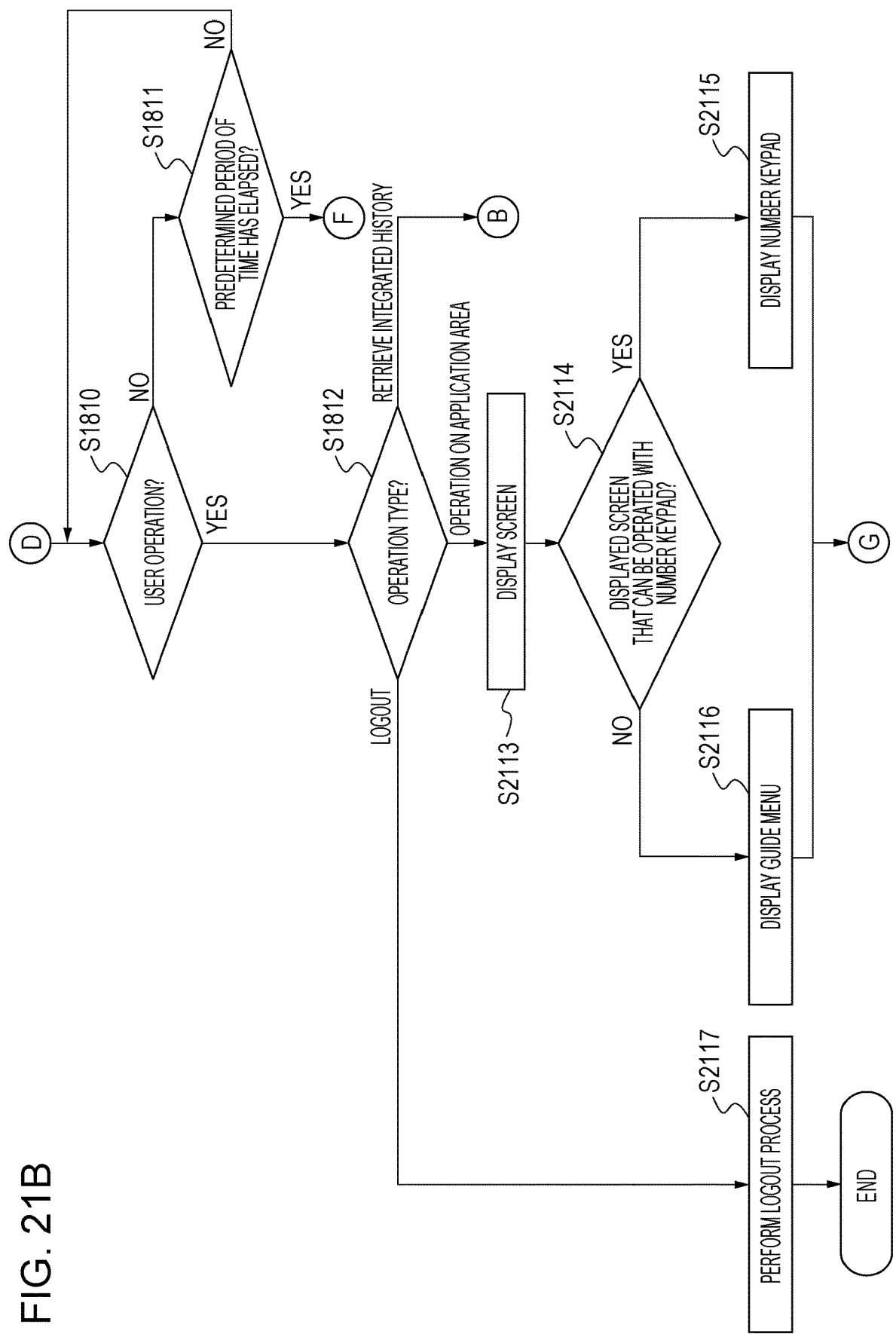

A process of switching the display information displayed in the integrated history group 512 with the initial screen of the logged-in user being displayed is described with reference to FIGS. 21A and 21B. Note that the same reference numerals are used hereinafter to describe those processes that are identical to the processes described above, and detailed description of the processes is not given here.

In step S2102, the operation processing unit 204 retrieves the user information 2001. Thereafter, the operation processing unit 204 determines whether the initial screen set in the user information 2001 is the home screen 542 (step S2103). If the initial screen is the home screen 542, the operation processing unit 204 performs the processes in step S1802 and the subsequent steps illustrated in FIGS. 18A and 18B. However, if the initial screen is other than the home screen 542, the operation processing unit 204 displays an application screen corresponding to the application ID set as the initial screen ID in the user information 2001 (step S2104). According to the present exemplary embodiment, the application screen (the copy screen 700) corresponding to an application ID of "101 (copy)" is displayed on the basis of the setting in FIG. 19. Note that the process performed in step S2103 is not limited to determination as to whether the initial screen is the home screen 542. For example, a process of determining the initial screen on the basis of the user information 2001 may be performed.

In step S2105, the operation processing unit 204 acquires the data 1001 for the logged-in user integrated history group 512 stored in the HDD 103 via the user information management unit 202. In step S2106, the operation processing unit 204 acquires, from the user information management unit 202, a setting 1702 for "After login or after a predetermined period of inactivity".

If the setting 1702 is "Display all", the processing proceeds to step S2107, where the operation processing unit 204 displays the logged-in user data 1001 acquired in step S2105 in the integrated history group 512. More specifically, in addition to the history button generated by executing the printing function, the integrated history group 512 has, displayed therein, a history button of a transmission application that transmits scan data to the outside. In this way, the operation processing unit 204 can receive an instruction for executing another application by the history button while displaying the application screen for a copy function.

If the setting 1702 is "Filter by displayed application", the processing proceeds to step S2108, where the operation processing unit 204 displays, in the integrated history group 512, the data 1001 having an application ID that is the same as the application ID in the user information 2001. According to the present exemplary embodiment, only history buttons having an application ID of "101 (copy)" in the data 1001 are displayed in the integrated history group 512. For example, when only the copy application history button is displayed in the integrated history group 512, the user does not input specific settings for the copy application but rather selects the history button. Thus, the user need not input the settings to the application screen.

If the setting 1702 is "Filter by not-displayed application", the processing proceeds to step S2109, where the operation processing unit 204 displays, in the integrated history group 512, the data 1001 having an application ID that is not the same as the application ID in the user information 2001. According to the present exemplary embodiment, the history buttons each having an application ID other than "101 (copy)" in the data 1001 are displayed in the integrated history data group. For example, an instruction to execute another application can be received by the history button while displaying the application screen for the copy function.

If, as a result of analysis of the user operation in step S1812, it is determined that the user operation is performed on the integrated history group 512, the flow illustrated in FIG. 13 is performed, and an application is called by using the selected history button.

If, in step S1812, it is determined that the user operation is performed on the application screen, the operation processing unit 204 displays a specific screen in accordance with the operation performed on the application screen in step S2113. For example, if "Other functions" button 711 in the copy screen 700 is pressed, a screen (not illustrated) displaying other functions is displayed. However, if an operation is performed on an area other than the buttons in the copy screen 700, the screen does not change to another screen and remains unchanged.

In step S2114, the operation processing unit 204 determines whether the currently displayed screen is a screen that allows the user to use a number keypad (step S2114). If the operation processing unit 204 determines that the screen allows the user to use a number keypad, the operation processing unit 204 displays the number keypad 720 in the side menu area 541 (step S2115). For example, if the copy screen illustrated in FIG. 7A remains unchanged, it is determined that a number keypad can be used, and the copy screen and the number keypad are displayed as illustrated in FIG. 7A.

However, if, in step S2114, it is determined that the screen does not allow the user to use a number keypad, the operation processing unit 204 displays, in the side menu area 541, a guide menu related to the currently displayed application screen in step S2116. An example of the display screen at this time is illustrated in FIG. 7C. A guide menu is displayed in the side menu area 541, and a screen describing how to apply the 2-sided copy settings is displayed in the menu area 540 as a screen that does not allow the user to use a number keypad. After steps S2115 and S2116 are performed, the processing returns to step S1810, where the operation processing unit 204 determines again whether there is a user operation.

If, in step S1812, the operation processing unit 204 determines that the user operation is for a logout process, the operation processing unit 204 performs a logout process in step S2117 and, thereafter, ends the processing.

While the present exemplary embodiment has been described with reference to the technique for displaying, in the side menu area 541, a guide menu related to the function of the application currently displayed in step S2116, the displayed information is not limited thereto. The information related to the logged-in user's job or the information related to the total number of printed sheets may be displayed. Alternatively, the display area of the currently displayed application screen may be expanded.

As described above, even when the initial screen is predetermined, the display format of the integrated history group can be determined in advance, and the display information displayed in the integrated history group can be changed in accordance with the display format. In this manner, useful information can be displayed in the limited display area without increasing the number of operations performed by the user.

Third Exemplary Embodiment

According to the present exemplary embodiment, an operation of changing display information in the integrated history group 512 by a user's manual operation performed on the display switching button 511 is described below.

The display text on the display switching button 511 indicates the current display setting for the integrated history group 512. For example, in FIG. 5A, the text "Display all" is displayed on the display switching button 511. This means that the history buttons displayed in the integrated history group 512 are "all displayed" without being sorted. If the text "Filter by displayed application" is displayed on the display switching button 511, this means that the history buttons displayed in the integrated history group 512 have been "filtered by displayed application". If the text "Filter by not-displayed application" is displayed on the display switching button 511, this means that the history buttons displayed in the integrated history group 512 have been "filtered by not-displayed application".

In FIG. 7A, the text "Hidden" is displayed on the display switching button 511, indicating that the history buttons displayed on the integrated history group 512 are "hidden". As illustrated in FIG. 7C, if the guide menu is displayed instead of displaying the integrated history group 512, the display switching button 511 need not be displayed. Alternatively, as illustrated in FIG. 7A, the display switching button 511 may be still displayed, and the information indicating that the history button is "hidden" may be clearly displayed.

By displaying, on the display switching button 511, how the integrated history group 512 is displayed, the user can be easily aware of how the integrated history group 512 is displayed.

Display Format of Display Switching Button

Figure 22:
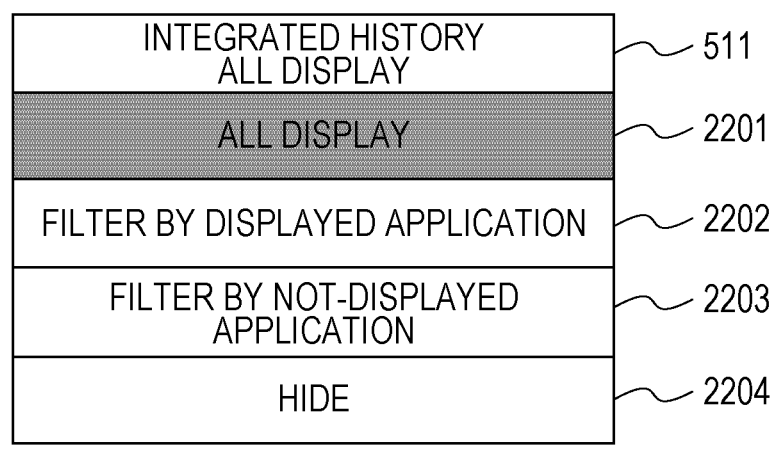
FIG. 22 is a schematic illustration of an integrated history display format switching screen.

An operation of switching between display formats by using the display switching button 511 is described with reference to FIG. 22. FIG. 22 illustrates selection items displayed when the display switching button 511 is selected. An operation for displaying the selection items (a page transition instruction) may be a touch operation or flick operation of the display switching button 511. According to the present exemplary embodiment, the operation is not limited to any particular one.

Each of selection item buttons 2201 to 2204 represents one of the display settings of the display switching button 511. The selection item button 2201 is an "all display" button. The selection item button 2202 is a "filter by displayed application" button, the selection item button 2203 is a "filter by not-displayed application" button, and the selection item button 2204 is a "hide" button. If any one of the buttons 2201 to 2203 is pressed, the display information in the integrated history group 512 is switched. If the button 2204 is pressed, the information in the integrated history group 512 is hidden. If the screen displayed in the menu area 540 is a screen that can be used with a number keypad for an operation, the number keypad is displayed when the button 2204 is selected. However, if the screen displayed in the menu area 540 is a screen that cannot be used with a number keypad for an operation, a guide menu related to the application screen currently displayed is displayed when the button 2204 is selected. Note that a menu item for displaying a number keypad or a guide menu may be added above the selection items illustrated in FIG. 22, and the selection items that do not provide the display format corresponding to the added menu item may be grayed out.

While the present exemplary embodiment has been described with reference to a technique of displaying a guide menu related to the function of the currently displayed application over the number keypad 720 when "Hide" is selected, the information related to the logged-in user's job or the information related to the total number of printed sheets may be displayed. Alternatively, the display area of the currently displayed application screen may be expanded.

Since the display format of the integrated history group 512 can be switched by using the display switching button 511, the user can easily find out a desired history button in the integrated history group.

Fourth Exemplary Embodiment

According to the first to third exemplary embodiments, the side menu area 541 is reserved in the home screen 542 in advance as an area for displaying the integrated history group 512. In addition, the information displayed in the integrated history group 512 is changed by the predetermined settings or a user's manual operation (with the display switching button 511).

Figure 24B:
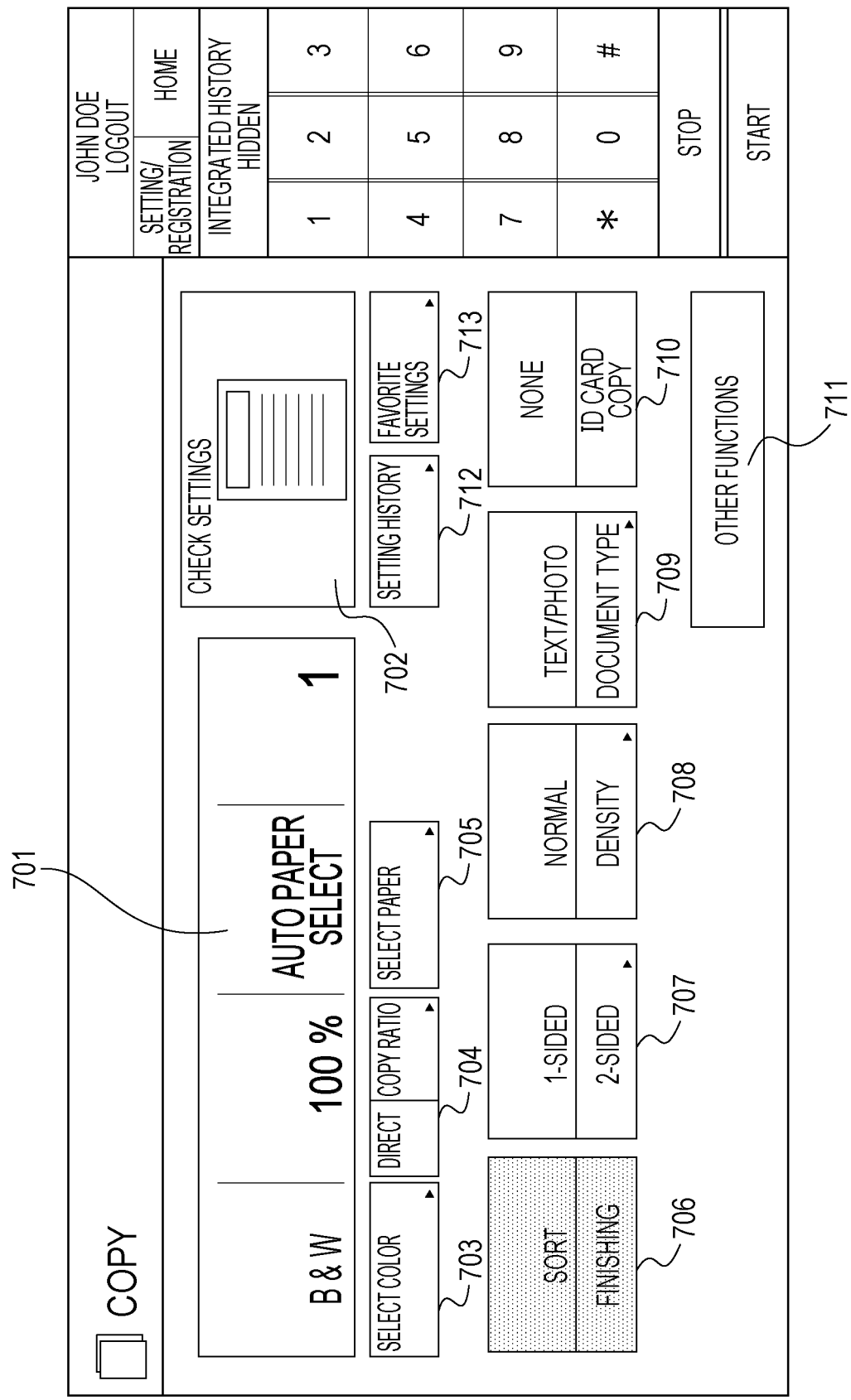

According to the present exemplary embodiment, another technique for displaying the integrated history group 512 is described. That is, a flick operation is performed on the integrated history group 512 that displays certain information A (for example, a history button) from the right edge to the left so that other information B (for example, a number keypad) is displayed (the integrated history group 512 is overlaid with the number keypad screen). The display screens when the above-described operation is performed are illustrated in FIGS. 24A and 24B.

Figure 23:
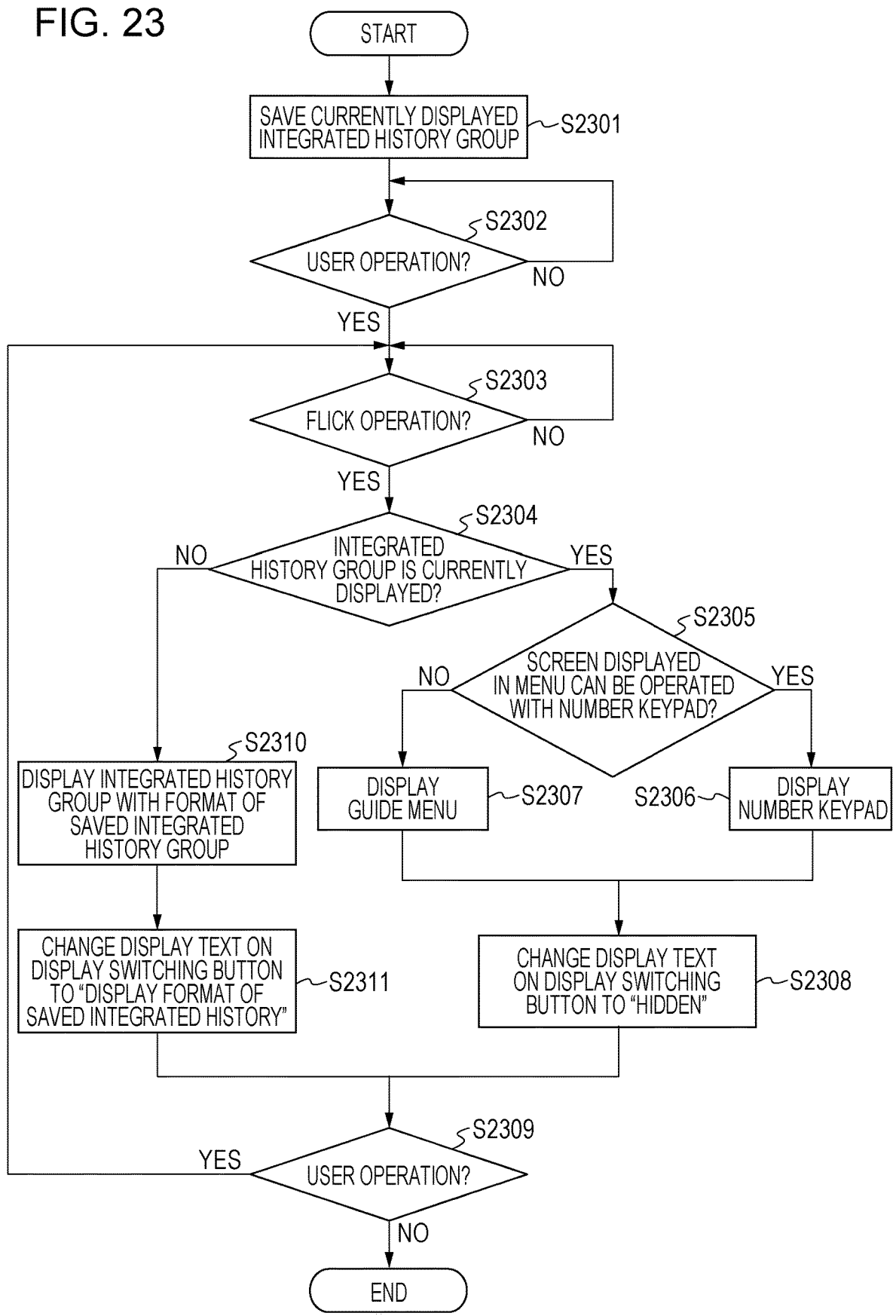
FIG. 23 is a flowchart illustrating an example of the process for switching a displayed integration history by a flick operation.

According to the present exemplary embodiment, an operation for changing the integrated history group 512 by flicking is described with reference to the flowchart illustrated in FIG. 23.

The operation processing unit 204 saves the currently displayed integrated history group 512 (step S2301). For example, if the integrated history group 512 is displayed with the setting "display all", the information is saved in the HDD 103. Subsequently, the operation processing unit 204 determines whether there is a user operation (step S2302). If there is a user operation, the operation processing unit 204 determines whether the user operation is a flick operation (step S2303). More specifically, the operation processing unit 204 determines whether the area of the display switching button 511 and the integrated history group 512 is flicked from left to right or from right to left via the input unit 121.

If, in step S2303, the operation processing unit 204 determines that the input user operation is a flick operation, the operation processing unit 204 determines whether the integrated history group 512 is currently displayed (step S2304). If the operation processing unit 204 determines that the integrated history group 512 is currently displayed, the operation processing unit 204 determines whether the screen displayed in the menu area 540 is a screen that allows the user to use a number keypad.

If the operation processing unit 204 determines that the screen is a screen that allows the user to use a number keypad, the operation processing unit 204 displays the number keypad 720 in the side menu area 541 (step S2306). However, if, in step S2305, the operation processing unit 204 determines that the screen is a screen that does not allow the user to use a number keypad, a guide menu related to the function of the application currently displayed is displayed in the area of the integrated history group 512 (step S2307). At the same time, the display text on the display switching button 511 is changed to "Hidden" (refer to FIG. 7A) (step S2308). In step S2309, the operation processing unit 204 is in a ready mode until the next user operation. If there is a user operation, the processing returns to step S2303. If a user operation is not input for a predetermined period of time, this processing ends.

If, in step S2304, the operation processing unit 204 determines that the integrated history group 512 is not currently displayed (for example, if the screen illustrated in FIG. 7A is displayed), the operation processing unit 204 acquires the previously displayed integrated history group 512 saved in the HDD 103 in step S2301 and switches the current area to the acquired integrated history group 512 (step S2310) and changes the display text on the display switching button 511 (step S2311).

According to the present exemplary embodiment, an example in which the integrated history group can be switched between the display mode or hidden mode by a flick operation. However, the integrated history group may be switched between two of the display formats ("Hide"↔"Display all"↔"Filter by displayed application"↔"Filter by not-displayed application"↔"Hide") by a flick operation. Alternatively, the history buttons may be displayed or hidden in accordance with a specific display format (for example, "Filter by displayed application") by a flick operation.

Note that the correspondence relationship between the direction of the flick operation in step S2303 (the right direction, left direction, upward direction, or downward direction) and the display or hidden mode of the integrated history group 512, the guide menu, or the number keypad is not limited to any particular correspondence relationship.

According to the present exemplary embodiment, since the integrated history group 512 is located on the right side of the display screen, the flick operation to switch the integrated history group 512 from the hidden mode to the display mode is performed from right to left. However, the flick direction to switch between the modes may be determined in accordance with the location of the integrated history group 512. For example, if the integrated history group 512 is located on the left side of the display screen, the flick operation to switch the integrated history group 512 from the hidden mode to the display mode may be performed from the left to right.

Other Embodiments

When the application ID is identified in, for example, steps S1806 and S1808 illustrated in FIGS. 18A and 18B, a custom button displayed on the home screen 542 is removed from identification. As a result, history buttons having application IDs the same as or different from those of the application buttons displayed on the home screen 542 are registered in the integrated history group 512. The reason for removing the custom button from the processing targets is the difference in importance of existence between the custom button and the history button. The user's favorite settings are registered in advance as a custom button, while the settings of the executed job are registered in the integrated history group 512 as a history button. That is, if a history button having the settings the same as those of a custom button, which the user intentionally registered in the home screen 542, is registered in the integrated history group 512, the home screen 542 is not effectively used.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-048235 filed Mar. 15, 2019, which is hereby incorporated by reference herein in its entirety.

What is claimed is:

1. An information processing apparatus, comprising:
a display unit configured to display a first soft key in a first display area of a display screen of the information processing apparatus, display a second soft key in a second display area of the display screen, display a setting screen that contains, as initial settings, settings predetermined by a user as default settings if the first soft key is selected by a user, and display a setting screen that contains, as initial settings, settings of a job executed by using one of a plurality of functions of the information processing apparatus if the second soft key is selected by the user; and
a setting unit configured to set a display condition for displaying the second soft key in the second display area,
wherein one of the second soft key for use of a function that differs from a function available by selecting the first soft key and the second soft key for use of a function that is the same as a function available by selecting the first soft key is displayed in the second display area, in accordance with the display condition set by the setting unit.

2. The information processing apparatus according to claim 1, wherein the first soft key displayed in the first display area and the second soft key displayed in the second display area are changed by a page feed instruction generated by an user operation, and
wherein if the second soft key is hidden in accordance with the display condition set by the setting unit, one of a number keypad and a guide menu is displayed in the second display area.

3. The information processing apparatus according to claim 2, wherein in a case where display information displayed in the first display area by selecting the first soft key includes a setting item changeable by the number keypad, the number keypad is displayed in the second display area, and
wherein in a case where the display information does not include the setting item, the guide menu relating to the display information is displayed in the second display area.

4. The information processing apparatus according to claim 1,
wherein when the second soft key is displayed in accordance with the display condition set by the setting unit, the display condition is displayed so as to be recognizable to the user.

5. The information processing apparatus according to claim 4,
wherein the display condition is at least one of a condition to hide the second soft key,
a condition to display the second soft key such that a function usable with the second soft key differs from a function usable with the first soft key displayed together with the second soft key, and a condition to display the second soft key such that a function usable with the second soft key is the same as a function usable with the first soft key displayed together with the second soft key.

6. The information processing apparatus according to claim 1,
wherein the information processing apparatus is capable of setting the initial display information that the information processing apparatus displays in the first display area immediately after the user logs in, and
wherein the second soft key relating to the initial display information displayed in the first display area is displayed in the second display area in accordance with the display condition set by the setting unit, or
the second soft key relating to the initial display information displayed in the first display area is not displayed.

7. The information processing apparatus according to claim 1, further comprising:
a management unit configured to manage first identification information used to identify a function used when the job is executed; and
a determination unit configured to determine whether the first identification information about the executed job is the same as second identification information used to identify a function used when the first soft key displayed in the first display area is pressed,
wherein in a case where the first soft key
includes a custom button used to use the function on a basis of settings set by the user, the custom button is removed from determination made by the determination unit, and
wherein the second soft key other than the custom button corresponding to the second identification information that is not the same as the first identification information is displayed in the second display area by the determination unit.

8. The information processing apparatus according to claim 1,
wherein the information processing apparatus is an image processing apparatus having at least one of a copy function and a scan function.

9. A method for controlling an information processing apparatus, the information processing apparatus displaying a first soft key in a first display area of a display screen of the information processing apparatus, displaying a second soft key in a second display area of the display screen, displaying a setting screen that contains, as initial settings, settings predetermined by a user as default settings if the first soft key is selected, and displaying a setting screen that contains, as initial settings, settings of a job executed by using one of a plurality of functions of the information processing apparatus if the second soft key is selected, the method comprising:
setting a display condition for displaying the second soft key in the second display area; and
displaying, in the second display area, one of the second soft key for using a function that differs from a function available by selecting the first soft key and the second soft key for using a function that is the same as a function available by selecting the first soft key in accordance with the set display condition.

10. A non-transitory storage medium storing instructions that, when executed by one or more processors of an information processing apparatus for displaying a first soft key in a first display area of a display screen and displaying a second soft key in a second display area of the display screen, where the information processing apparatus displays a setting screen that contains, as initial settings, settings predetermined by a user as default settings if the first soft key is selected, and displays a setting screen that contains, as initial settings, settings of a job executed by using one of a plurality of functions of the information processing apparatus if the second soft key is selected, cause the information processing apparatus to perform a method, the method comprising:
setting a display condition for displaying the second soft key in the second display area; and
displaying, in the second display area of the display screen, one of the second soft key for use of a function that differs from a function available by selecting the first soft key and the second soft key for use of a function that is the same as a function available by selecting the first soft key, in accordance with the display condition set by the setting.

* * * * *